(12) United States Patent
Valcore, Jr. et al.

(10) Patent No.: US 10,191,466 B2
(45) Date of Patent: Jan. 29, 2019

(54) SYSTEMS AND METHODS FOR SYNCHRONIZING EXECUTION OF RECIPE SETS

(71) Applicant: Lam Research Corporation, Fremont, CA (US)

(72) Inventors: John C. Valcore, Jr., Fremont, CA (US); Tony San, Sunnyvale, CA (US); Bostjan Pust, San Ramon, CA (US)

(73) Assignee: Lam Research Corporation, Fremont, CA (US)

( * ) Notice: Subject to any disclaimer, the term of this patent is extended or adjusted under 35 U.S.C. 154(b) by 302 days.

(21) Appl. No.: 15/148,414

(22) Filed: May 6, 2016

(65) Prior Publication Data

US 2016/0252892 A1    Sep. 1, 2016

Related U.S. Application Data

(63) Continuation-in-part of application No. 14/974,915, filed on Dec. 18, 2015, now Pat. No. 9,667,303.

(60) Provisional application No. 62/171,941, filed on Jun. 5, 2015, provisional application No. 62/109,010, filed on Jan. 28, 2015.

(51) Int. Cl.
*G05B 19/05*    (2006.01)
*H04B 1/40*    (2015.01)
*H04L 25/02*    (2006.01)

(52) U.S. Cl.
CPC ............. *G05B 19/052* (2013.01); *H04B 1/40* (2013.01); *H04L 25/0278* (2013.01); *G05B 2219/1215* (2013.01)

(58) Field of Classification Search
CPC .......... G05B 19/052; G05B 2219/1215; H04B 1/40; H04L 25/0278
See application file for complete search history.

(56) References Cited

U.S. PATENT DOCUMENTS

| | | |
|---|---|---|
| 6,887,339 B1 | 3/2005 | Goodman et al. |
| 7,452,443 B2 | 11/2008 | Glück et al. |
| 7,612,598 B2 | 11/2009 | Endo |
| 7,639,058 B2 | 12/2009 | Kurodawa et al. |

(Continued)

OTHER PUBLICATIONS

EtherCAT Technology Group, "EtherCAT—the Ethernet Fieldbus", https://www.ethercat.org/en/technology.html, 10 pages.

(Continued)

*Primary Examiner* — Yuhui R Pan
(74) *Attorney, Agent, or Firm* — Martine Penilla Group, LLP

(57) ABSTRACT

Systems and methods for synchronizing execution of recipe sets are described. One of the methods includes sending by a command controller to a master controller a recipe set and sending by the master controller the recipe set for execution by a sub-system controller of a plasma system. The operation of sending the recipe set from the master controller to the sub-controller is performed during a first clock cycle of a clock signal. The method includes generating by the command controller a recipe event signal and sending by the command controller to the sub-system controller the recipe event signal indicating a time of execution of the recipe set by the sub-system controller. The time of execution occurs during a second clock cycle that follows the first clock cycle. The second cycle is of the clock signal.

30 Claims, 15 Drawing Sheets

(56) References Cited

U.S. PATENT DOCUMENTS

| | | |
|---|---|---|
| 7,981,306 B2 | 7/2011 | Blattner et al. |
| 8,133,347 B2 | 3/2012 | Glück et al. |
| 8,368,308 B2 | 2/2013 | Banna et al. |
| 8,374,303 B2 | 2/2013 | Endo |
| 8,416,000 B2 | 4/2013 | Endo |
| 8,974,684 B2 | 3/2015 | Banna et al. |
| 9,043,525 B2 | 5/2015 | Valcore, Jr. |
| 2005/0241762 A1 | 11/2005 | Paterson et al. |
| 2008/0177397 A1* | 7/2008 | Davlin ............... G05B 19/0421 700/3 |
| 2014/0009073 A1* | 1/2014 | Valcore, Jr. .............. H05H 1/46 315/183 |
| 2014/0190571 A1* | 7/2014 | Ding ................... G05D 7/0635 137/1 |

OTHER PUBLICATIONS

Rouse, Margaret, "Gigabit Ethernet", http://searchnetworking.techtarget.com/definition/Gigabit-Ethernet, Apr. 2007, 1 page.

Wikipedia, "General-purpose input/output/", https://en.wikipedia.org/wiki/General-purpose_input/output, last modified on Apr. 28, 2016, 2 pages.

Wikipedia, "Gigabit Ethernet", https://en.wikipedia.org/wiki/Gigabit_Ethernet, page last modified Jun. 15, 2016, 7 pages.

Wikipedia, "Serial Peripheral Interface Bus", https://en.wikipedia.org/wiki/Serial_Peripheral_Interface_Bus, page last modified on Jun. 24, 2016, 13 pages.

\* cited by examiner

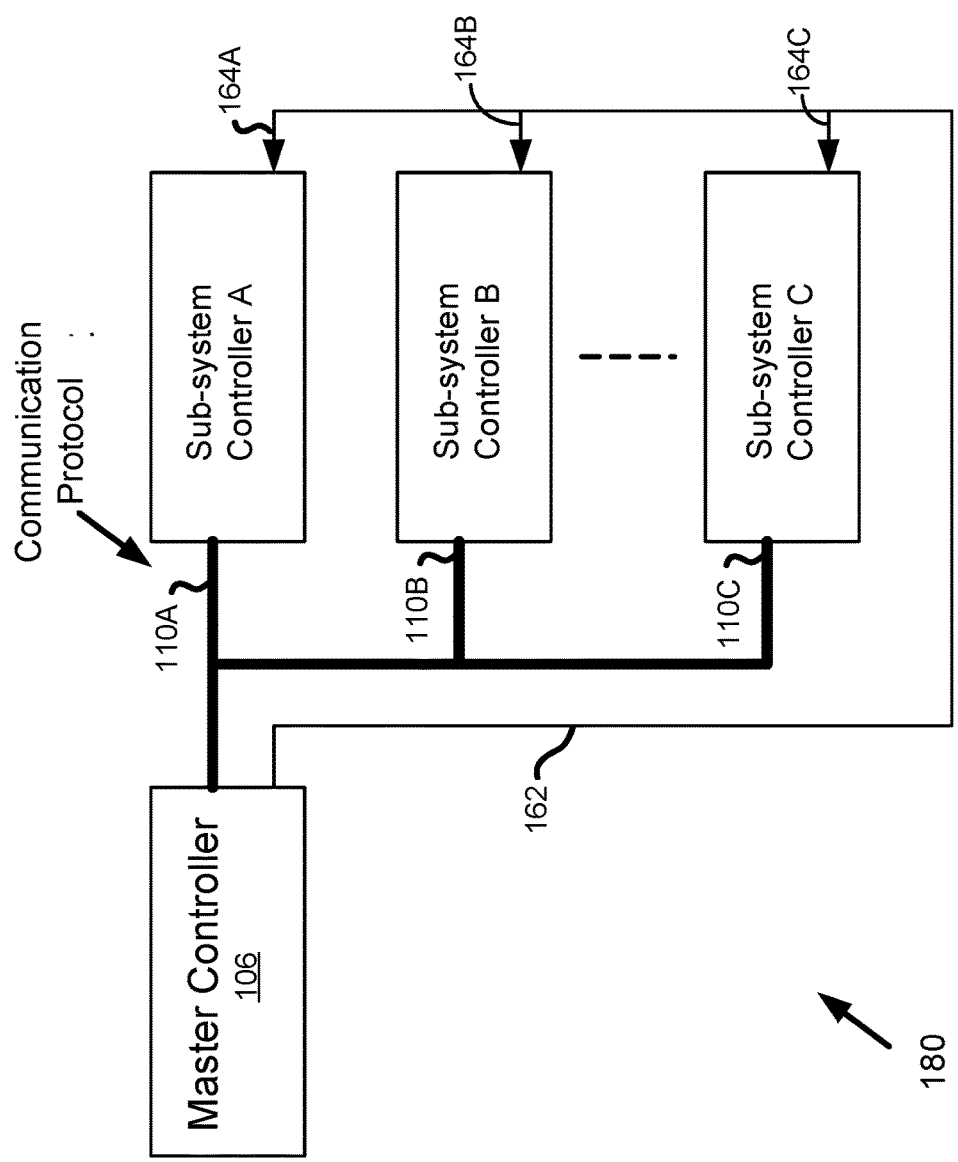

SYSTEMS AND METHODS FOR SYNCHRONIZING EXECUTION OF RECIPE SETS

CLAIM OF PRIORITY

The present patent application claims the benefit of and priority, under 35 U.S.C. § 119(e), to U.S. Provisional Patent Application No. 62/171,941, filed on Jun. 5, 2015, and titled "SYSTEMS AND METHODS FOR SYNCHRONIZING EXECUTION OF RECIPE SETS", which is incorporated by reference herein in its entirety for all purposes.

The present patent application is a continuation-in-part of and claims the benefit of and priority, under 35 U.S.C. § 120, to U.S. patent application Ser. No. 14/974,915, filed on Dec. 18, 2015, and titled "Dual Push Between A Host Computer System And An RF Generator", which claims the benefit of and priority, under 35 U.S.C. § 119(e), to U.S. Provisional Patent Application No. 62/109,010, filed on Jan. 28, 2015, and titled "Dual Push Between A Host Computer System And An RF Generator", both of which are incorporated by reference herein in their entirety for all purposes

FIELD

The present embodiments relate to systems and methods for synchronizing execution of recipe sets.

BACKGROUND

Plasma systems are used to perform a variety of operations. For example, plasma systems have multiple stations for cleaning wafers, depositing materials on wafers, etching wafers, etc. Each station is controlled by one or more processing devices for performing the operations.

Information is transferred between the processing devices to perform the operations. However, to transfer the information, each processing device is under a tight schedule. For example, each processing device has to process data within a pre-specified time window before providing the processed data to another processing device.

Such time window requirements results in costly processing devices. Also, data transfer rates are limited between the processing devices when using the processing devices.

It is in this context that embodiments described in the present disclosure arise.

SUMMARY

Embodiments of the disclosure provide apparatus, methods and computer programs for synchronizing execution of recipe sets. It should be appreciated that the present embodiments can be implemented in numerous ways, e.g., a process, or an apparatus, or a system, or a piece of hardware, or a method, or a computer-readable medium. Several embodiments are described below.

In one embodiment, a recipe set to be executed is sent from a controller to another controller before sending a signal for execution of the recipe set. For example, a master controller sends the recipe set to a slave controller before sending a pulse indicating that the slave controller execute the recipe set. Such prior sending of the recipe set provides the slave controller with time to prepare for execution of the recipe set. As soon as the pulse indicating that the slave controller executes the recipe set is received, the slave controller executes the recipe set by sending the recipe set for processing.

Sending of multiple recipe sets to multiple slave controllers before sending the pulse indicating the execution of the recipe sets frees each of the slave controllers from executing the recipe sets within a time window. For example, in EtherCAT (Ethernet for Control Automation Technology), one slave controller receives multiple recipe sets, identifies one of the recipe sets, and executes the identified recipe set before sending the multiple recipe sets to another slave controller. The identification and execution is to be done within a time window, which is a constraint and adds to cost. Also, such EtherCAT slave controllers are costly and are difficult to obtain due to low volumes. Moreover, the EtherCAT slave controllers are limited in terms of speed, e.g., are limited to mega bits per second speed. By using the systems and methods for synchronizing execution of recipe sets, the sending of multiple recipe sets is done at gigabits per second (Gbps) or higher speed and there is no time window before which the slave controllers have to perform the identification and execution. The slave controllers execute the recipe sets immediately after the pulse indicating that the slave controllers execute the recipe sets is received by the slave controllers.

In one embodiment, a method for synchronizing execution of recipe sets is described. The method includes sending by a command controller to a master controller a recipe set and sending by the master controller the recipe set for execution by a sub-system controller of a plasma system. The operation of sending the recipe set from the master controller to the sub-system controller is performed during a first clock cycle of a clock signal. The method includes generating by the command controller a recipe event signal and sending by the command controller to the sub-system controller the recipe event signal indicating a time of execution of the recipe set by the sub-system controller. The time of execution occurs during a second clock cycle that follows the first clock cycle. The second cycle is of the clock signal.

In an embodiment, a method for synchronizing execution of recipe sets is described. The method includes sending by a master controller a recipe set for execution by a sub-system controller during a first clock cycle of a clock signal. The sub-system controller is configured to control a component of a plasma processing system. The method further includes generating by the master controller a recipe event signal and sending by the master controller the recipe event signal indicating a time of execution of the recipe set by the sub-system controller of the plasma processing system. The time of execution of the recipe set occurs during a second clock cycle that follows the first clock cycle during which the recipe set is sent. The second cycle is of the clock signal.

In one embodiment, a method for synchronizing execution of recipe sets is described. The method includes sending by a master controller a recipe set to a processor of a sub-system of a plasma processing system. The operation of sending from the master controller occurs during a first clock cycle of a clock signal. The method further includes generating by the master controller a recipe event signal and sending by the master controller the recipe event signal indicating a time of execution of the recipe set to the processor of the sub-system. The operation of sending the time of execution occurs during a second clock cycle following the first clock cycle.

Some advantages of some of the above-described embodiments include synchronizing execution of recipe sets among multiple controllers. For example, (n+1)th recipe sets are sent in a synchronized manner from a sending controller to one or more receiving controllers. After sending the (n+1)th recipe sets to the receiving controllers, the sending controller or another controller provides a recipe event signal to signal that the receiving controllers initiate execution of the recipe sets. The time between sending the (n+1)th recipe sets and sending the recipe event signal allows the receiving controllers to prepare for execution of the (n+1)th recipe sets. For example, the (n+1)th recipe sets are sent to the receiving controllers during a time a wafer is being loaded into a plasma chamber. When the recipe event signal is sent to the receiving controllers, the wafer has already been loaded. Moreover, as soon as the recipe event signal is received by the receiving controllers, the receiving controllers execute the recipe sets to initiate processing the wafer.

Other advantages include use of a communication protocol, e.g., an Ethernet protocol, a universal datagram protocol (UDP), a UDP over Internet Protocol (UDP over IP), UDP over IP over Ethernet, a customized protocol, etc., that has data transfer rates in gigabits or higher. The (n+1)th recipe sets are embedded into packets as payloads of the packets generated by applying the communication protocol to transfer the (n+1)th recipe sets. Such use of the communication protocol allows achievement of gigabits per second or higher transfer rates. Use of the communication protocol saves time and is more cost effective compared to the EtherCAT protocol.

Other aspects will become apparent from the following detailed description, taken in conjunction with the accompanying drawings.

BRIEF DESCRIPTION OF THE DRAWINGS

The embodiments are understood by reference to the following description taken in conjunction with the accompanying drawings.

FIG. 1A-2 is a diagram of an embodiment of a system similar to the system of FIG. 1A-1.

FIG. 1B-1 is a diagram of an embodiment of a system for illustrating synchronization between sub-system controllers and a master controller without receiving an input signal from a user via an input device.

FIG. 1B-2 is a diagram of an embodiment of a system that is the similar to the system of FIG. 1B-1.

FIG. 2A-1 is an embodiment of a timing diagram to illustrate synchronization between sending (n+1)th recipe sets to controllers and time of execution of the recipe sets by the controllers.

FIG. 2A-2 is an embodiment of a timing diagram to illustrate that a time of execution of a packet by a controller varies between a time at which the packet is received by the controller and a later time at which a digital pulse indicating that the packet be executed is received.

DETAILED DESCRIPTION

The following embodiments describe systems and methods for synchronizing execution of recipe sets. It will be apparent that the present embodiments may be practiced without some or all of these specific details. In other instances, well known process operations have not been described in detail in order not to unnecessarily obscure the present embodiments.

Figures 1, 1A:
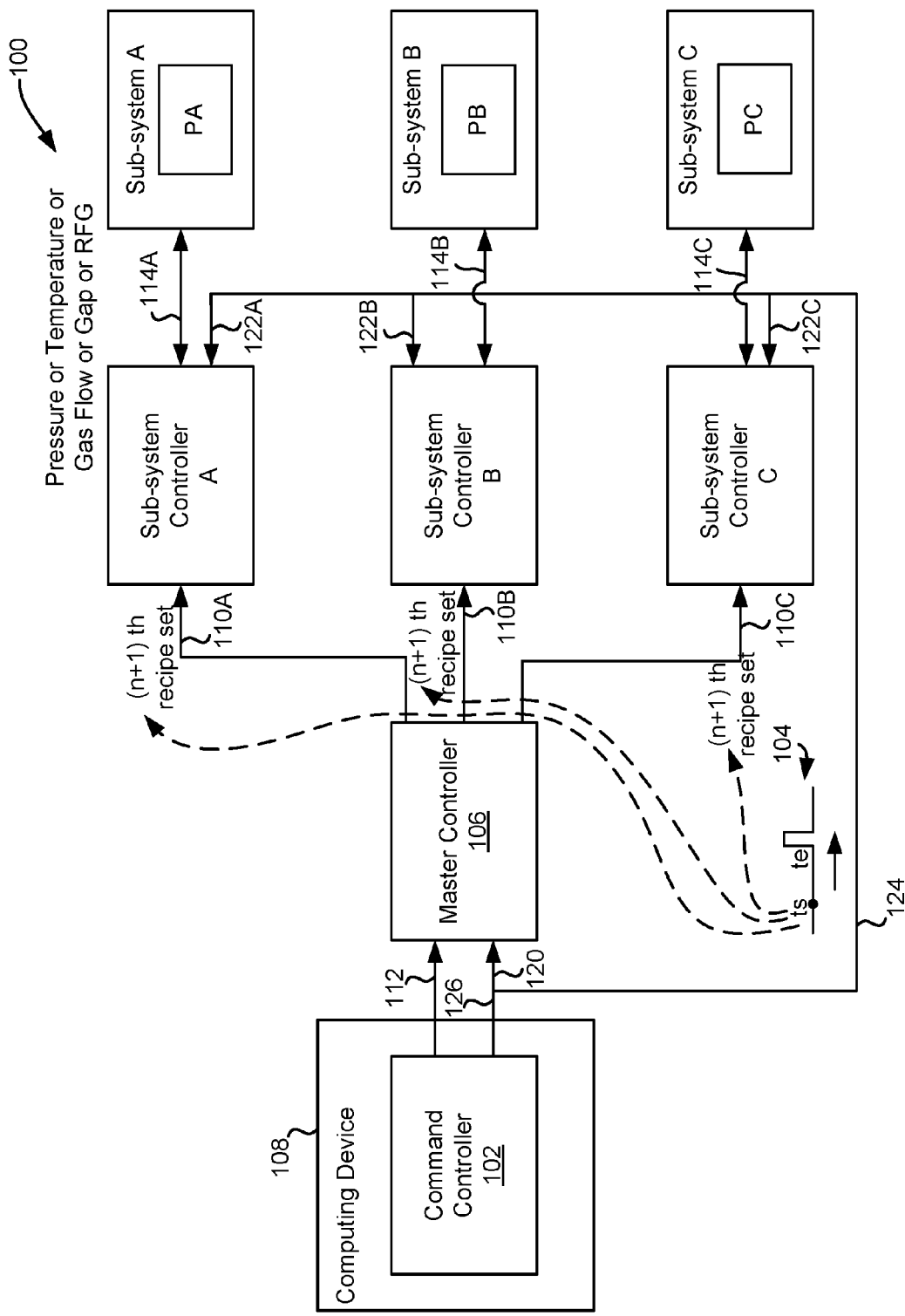
FIG. 1A-1 is a diagram of an embodiment of a system to illustrate synchronization of execution of recipe sets across different sub-system controllers.

FIG. 1A-1 is a diagram of an embodiment of a system 100 to illustrate synchronization of execution of recipe sets across different sub-system controllers. The system 100 includes a command controller 102 that is located within a computing device 108. As used herein, a controller includes one or more processors and one or more memory devices. A processor, as used herein, refers to a central processing unit (CPU), an application specific integrated circuit (ASIC), or a programmable logic device (PLD) is used, and these terms are used interchangeably herein. Examples of a memory device include a read-only memory (ROM), a random access memory (RAM), a hard disk, a volatile memory, a non-volatile memory, a redundant array of storage disks, a Flash memory, etc. An example of the computing device 108 includes a laptop computer or a desktop computer or a tablet or a mobile phone.

The system 100 further includes a master controller 106 that is connected to the command controller 102 via a transfer medium 112. Examples of a transfer medium, as used herein, include a coaxial cable, a conductor cable, a wired medium, a twisted pair, a fiber optic cable, a cable, an Ethernet cable, a wireless medium, a combination of a wired medium and a wireless medium, etc. Examples of a communication protocol include a universal datagram protocol (UDP), a UDP over Internet Protocol (UDP over IP), UDP over IP over Ethernet, a customized protocol, a serial transfer protocol, a parallel transfer protocol, a universal serial bus (USB) protocol, a customized communication protocol, etc. Examples of the serial protocol include, e.g., an RS 232 protocol, an RS 422 protocol, an RS 423 protocol, an RS 485 protocol, etc. In various embodiments, in the serial protocol, data is transferred in a serial manner. For example, one bit is transferred sequentially after another bit is transferred. An example of the parallel protocol is one that transfers data in a parallel manner. To illustrate, in the parallel protocol, multiple bits are transferred simultaneously, etc. In some embodiments, the terms transfer medium and link are used interchangeably herein. In several embodiments, the serial protocol or the parallel protocol is referred to herein as a non-packetized protocol.

The system 100 includes a sub-system controller A, a sub-system controller B, and a sub-system controller C. The sub-system controller A is connected to the master controller 106 via a transfer medium 110A, the sub-system controller B is connected to the master controller 106 via a transfer medium 110B, and the sub-system controller C is connected to the master controller 106 via a transfer medium 110C.

Moreover, each sub-system controller is connected to a corresponding sub-system via one or more corresponding physical mediums, which are described as physical communication mediums in the U.S. patent application Ser. No. 14/974,915. For example, the sub-system controller A is connected to the sub-system A via a dedicated physical medium, the sub-system controller B is connected to the sub-system B via a dedicated physical medium, and the sub-system controller C is connected to the sub-system C via dedicated physical medium.

It should be noted that in some embodiments, the terms sub-system and component are used interchangeably herein.

An example of a sub-system includes a radio frequency (RF) generator, or a pressure sub-system, or a temperature sub-system, or a gap sub-system, or a gas flow sub-system, or a cooling liquid flow sub-system, or an impedance matching network. To illustrate, the sub-system A is an x megahertz (MHz), e.g., 2 MHz, etc., radio frequency (RF) generator, the sub-system B is a y megahertz RF generator, and the sub-system C is a z megahertz RF generator. An example of y includes 2 or 27 and an example of z includes 27 or 60. In an embodiment, instead of the x MHz RF generator, a kilohertz (kHz), e.g., 400 kHz, etc., RF generator is used.

The pressure sub-system includes multiple parts, e.g., a pressure controller, a driver, a motor, one or more rods, confinement rings, etc. The pressure controller is connected via the driver to the motor, which is further connected via the one or more rods to the confinement rings within a plasma chamber. The plasma chamber is further described below. Examples of a driver include a transistor or a group of transistors. A processor of the pressure controller sends a signal to the driver to drive the motor to rotate a rotor of the motor. The rotation of the rotor controls an amount of movement of the confinement rings via the one or more rods to further to change pressure within the plasma chamber.

In an embodiment, instead of the pressure controller being located within the pressure sub-system, the pressure controller is an example of the sub-system controller A and remaining parts of the pressure sub-system described above are located in the pressure sub-system.

The temperature sub-system includes multiple parts, e.g., a temperature controller, a driver, a heater, etc. The temperature controller is connected via the driver to the heater. A temperature processor of the temperature controller sends a signal to the driver to generate an amount of current. The driver generates the amount of current and provides the current to the heater. The heater generates heat for heating the plasma chamber.

In an embodiment, instead of the temperature controller being located within the temperature sub-system, the temperature controller is an example of the sub-system controller B and remaining parts of the temperature sub-system described above are located in the temperature sub-system.

The gap sub-system includes parts, e.g., a gap controller, a gap driver, a motor, one or more rods, etc. The gap controller is connected via the gap driver to the motor, which is connected via the one or more rods to an upper electrode of the plasma chamber. A gap processor of the gap controller sends a signal to the driver to generate an amount of current, which is provided to the motor to rotate a rotor of the motor. The rotation of the rotor rotates the one or more rods to change the gap between the upper electrode and a lower electrode of the plasma chamber.

In an embodiment, instead of the gap controller being located within the gap sub-system, the gap controller is an example of the sub-system controller C and remaining parts of the gap sub-system described above are located in the gap sub-system.

The gas flow sub-system includes multiple parts, e.g., a gas flow controller, a driver, a motor, a valve, a tube, one or more rods, a gas source, etc. The gas source stores a process gas for processing, e.g., depositing materials on, sputtering materials on, etching, cleaning, etc., a substrate, e.g., a semiconductor wafer, etc., within the plasma chamber. Examples of the process gas include an oxygen-containing gas or a fluorine-containing gas, etc. A gas flow processor of the gas flow controller sends the signal to the driver, which generates a current to drive the motor. The motor rotates to change a position of the valve within the tube via the one or more rods to further achieve an amount of gas flow from the gas source to the plasma chamber via the tube.

In an embodiment, instead of the gas flow controller being located within the gas flow sub-system, the gas flow controller is an example of the sub-system controller A and remaining parts of the gas flow sub-system described above are located in the gas flow sub-system.

In one embodiment, instead of the motor within the gas flow sub-system, an electromagnetic current that is generated by the driver of the gas flow sub-system controls an amount by which the valve of the gas flow sub-system opens or closes.

The cooling flow sub-system has the same parts and operates in the same manner as that of the gas flow sub-system except that instead of the gas source, a source that stores a cooling liquid is used, and an output of the cooling flow sub-system is connected to a component, e.g., the upper electrode, the lower electrode, an upper electrode extension, a lower electrode extension, etc., of the plasma chamber to supply the cooling liquid to the component to cool the component.

The impedance matching network includes multiple parts, e.g., an impedance matching controller, one or more drivers, one or more motors, one or more capacitors, one or more inductors, one or more resistors, etc. A processor of the impedance matching controller sends a signal to one of the drivers, which generates a current. The current is provided to one of the motors to rotate a rotor of the motor to further change an area between plates of one of the one or more capacitors to alter a capacitance of the capacitor. Similarly, the processor of the impedance matching controller sends a signal to another one of the drivers, which generates a current. The current is provided to another one of the motors to rotate a rotor of the motor to further turn a core of one of the inductors to change an inductance of the inductor or change spacing between coils of the one of the inductors to change the inductance. For example, an inductance of an inductor of the impedance matching network is modified by sliding a core of the inductor in or out of a coil of the inductor. The core is attached to the motor of the impedance matching network to slide the magnetic core.

The command controller 102 is coupled to an input device, e.g., a mouse, a keyboard, a stylus, a touch screen, etc., via an input/output (I/O) interface. Examples of an I/O interface include a serial port, or a parallel port, or a USB port, etc. Upon receiving a signal from a user via the input device and the I/O interface, the command controller 102 sends to the master controller 106 via the transfer medium 112, an (n+1)th recipe set for execution by the sub-system A, an (n+1)th recipe set for execution by sub-system B, and an (n+1)th recipe set for execution by the sub-system C. For example, the command controller applies the communication protocol to generate a packet that includes the (n+1)th recipe set to be executed by the sub-system A, applies the communication protocol to generate a packet that includes the (n+1)th recipe set to be executed by the sub-system B, and applies the communication protocol to generate a packet that includes the (n+1)th recipe set to be executed by the sub-system C and sends the packets via the transfer medium 112 to the master controller 106. As another example, the command controller 102 sends the (n+1)th recipe set by applying the non-packetized protocol, e.g., in the parallel manner or in the serial manner, etc. In some embodiments, the command controller sends the (n+1)th recipe sets to the master controller via the transfer medium 112 simultaneously, e.g., within the same clock cycle of a clock signal, at a rising edge of the clock cycle, at a falling edge of the clock cycle, etc.

It should be noted that in various embodiments, (n+1)th is used to illustrate that a recipe set is a next recipe set to be executed compared to an nth recipe set that was previously sent, where n is an integer greater than or equal to zero. For example, the nth recipe set is sent preceding to sending the (n+1)th recipe set. The (n+1)th recipe set is sent consecutive to sending the nth recipe set. In some embodiments, the nth recipe set is executed at a time the (n+1)th recipe set is sent.

Upon receiving the (n+1)th recipe sets for the sub-systems A, B, and C from the command controller 102, the master controller 106 identifies from a destination address, e.g., a media access control (MAC) address, etc., within a packet that includes one of the (n+1)th recipe sets to determine that the one of the (n+1)th recipe sets is for the sub-system A, identifies from a destination address within a packet that includes another one of the (n+1)th recipe sets to determine that the other one of the (n+1)th recipe sets is for the sub-system B, and identifies from a destination address within a packet that includes yet another one of the (n+1)th recipe sets to determine that the yet other one of the (n+1)th recipe sets is for the sub-system C. The master controller 106 sends the packet including the (n+1)th recipe set for the sub-system A via the transfer medium 110A to the sub-system controller A, sends the packet including the (n+1)th recipe set for the sub-system B via the transfer medium 110B to the sub-system controller B, and sends the packet including the (n+1)th recipe set for the sub-system C via the transfer medium 110C to the sub-system controller C.

In some embodiments in which the non-packetized protocol is applied, upon receiving the (n+1)th recipe sets for the sub-systems A, B, and C from the command controller 102, the master controller 106 identifies from a destination address within one of the (n+1)th recipe sets that the one of the (n+1)th recipe sets is for the sub-system A, identifies from a destination address within another one of the (n+1)th recipe sets that the other one of the (n+1)th recipe sets is for the sub-system B, and identifies from a destination address within yet another one of the (n+1)th recipe sets that the yet other one of the (n+1)th recipe sets is for the sub-system C. The master controller 106 sends in the parallel or the serial manner the (n+1)th recipe set for the sub-system A via the transfer medium 110A to the sub-system controller A, sends in the parallel or the serial manner the (n+1)th recipe set for the sub-system B via the transfer medium 110B to the sub-system controller B, and sends in the parallel or the serial manner the (n+1)th recipe set for the sub-system C via the transfer medium 110C to the sub-system controller C.

The (n+1)th recipe sets for the A, B, and C sub-systems are sent by the master controller 106 to the corresponding sub-system controllers A, B, and C simultaneously, e.g., during a first clock cycle, etc., of the clock signal. Examples of the first clock cycle include a clock cycle C1, a time ts, etc. To illustrate, the (n+1)th recipe sets for the A, B, and C sub-systems are sent during a rising edge or a falling edge of the first clock cycle to send the (n+1)th recipe sets in a synchronized manner to the corresponding sub-system controllers A, B, and C. The clock signal is generated by a clock source, e.g., an oscillator, an oscillator with a phase-locked loop, etc.

In an embodiment, the clock signal is generated by the clock source located within the computing device 108. In this embodiment, the clock signal is sent from the clock source to the command controller 102, the master controller 106, the sub-system controller A, the sub-system controller B, the sub-system controller C, and/or to any controllers or processors within the sub-systems A, B, and C.

In one embodiment, the clock signal is generated by the clock source that is located outside the computing device 108 and connected to the master controller 106. In this embodiment, the clock signal is sent from the clock source to the command controller 102, the master controller 106, the sub-system controller A, the sub-system controller B, the sub-system controller C, and/or to any controllers or processors within the sub-systems A, B, and C.

In some embodiments, the clock signal is generated by the clock source located within the master controller 106. In this embodiment, the clock signal is sent from the clock source to the command controller 102, the processor of the master controller 106, the sub-system controller A, the sub-system controller B, the sub-system controller C, and/or to any controllers or processors within the sub-systems A, B, and C.

Upon receiving an input from the user via the input device, the command controller 102 generates the recipe event signal 104. An example of the recipe event signal 104 includes a digital output signal or an analog output signal. The recipe event signal 104 is sent from the command controller 102 via a communication medium 126 and a communication medium 120 to the master controller 106, via the communication medium 126 and a communication medium 124 and a communication medium 122A to the sub-system controller A, via the communication medium 126 and a communication medium 124 and a communication medium 122B to the sub-system controller B, and via the communication medium 126 and a communication medium 124 and a communication medium 122C to the sub-system controller C. An example of a communication medium includes a wire or a cable or a combination of a wired medium and a wireless medium.

The recipe event signal 104 indicates a time te of execution of the (n+1)th recipe sets by the corresponding sub-system controllers A, B, and C. For example, upon receiving the recipe event signal 104, the sub-system controller A executes the (n+1)th recipe set for the sub-system A by sending the (n+1)th recipe set for the sub-system A via a link 114A to the sub-system A. Moreover, upon receiving the recipe event signal 104, the sub-system controller B executes the (n+1)th recipe set for the sub-system B by sending the (n+1)th recipe set for the sub-system B via a link 114B to the sub-system B. Also, upon receiving the recipe event signal 104, the sub-system controller C executes the (n+1)th recipe set for the sub-system C by sending the (n+1)th recipe set for the sub-system C via a link 114C to the sub-system C. The time of execution of the (n+1)th recipe sets by the corresponding sub-system controllers A, B, and C occurs during a second clock cycle, e.g., C2, C3, C4, C5, C6, the time te, etc., that follows the first clock cycle. For example, the first clock cycle precedes the second clock cycle. As another example, the second clock cycle occurs after one or more clock cycles that are preceded by the first clock cycle. The one or more clock cycles precede the second clock cycle. The second clock cycle and any clock cycles between the first and second clock cycles are of the clock signal.

The recipe event signal 104 acts as a trigger for execution, e.g., sending, etc., of an (n+1)th recipe set from a sub-system controller to a corresponding sub-system. For example, after receiving the (n+1)th recipe set for the sub-system A, the sub-system controller A waits to receive the recipe event signal 104 from the command controller 102. After the wait, upon receiving the recipe event signal 104, the sub-system controller A immediately sends the (n+1)th recipe set for the sub-system A to the sub-system A. To illustrate, during the same clock cycle in which the recipe event signal 104 is received from the command controller 102 by the sub-system controller A, the sub-system controller A sends the (n+1)th recipe set for the sub-system A to the sub-system A via the link 114A. As another example, after receiving the (n+1)th recipe set for the sub-system A, the sub-system controller A waits to receive the recipe event signal 104 from the command controller 102. During the wait time, the sub-system controller A performs error checking according to bits in a frame check sequence (FCS) field in a packet that includes the (n+1)th recipe set for the sub-system A. To illustrate, the sub-system controller A computes a sequence from bits of the (n+1)th recipe set stored within a payload field of the Ethernet packet and determines whether the computed sequence matches the bits in the FCS field. Upon determining that there is no match, the sub-system controller A generates and sends an error flag to the master controller 106 and/or to the command controller 102. On the other hand, upon detecting that there is a match, the sub-system controller A transfers the Ethernet packet from a receive buffer of the sub-system controller A to a transmit buffer of the sub-system controller A, and waits for receiving the recipe event signal 104. During a clock cycle in which the recipe event signal is received, the sub-system controller A sends, e.g., transmits, etc., the Ethernet packet to the sub-system A.

The recipe event signal 104 directs execution of an (n+1)th recipe set. For example, at a time, e.g. during a clock cycle, etc., the recipe event signal 104 is received from the command controller 102 or master controller 106 by a sub-system controller, the sub-system controller sends an (n+1)th recipe set to the corresponding sub-system for processing.

The recipe event signal 104 when received by a sub-system controller for a sub-system is indicative of immediate activation of processing of the recipe set. For example, when the recipe event signal 104 is received by the sub-system controller A at a time, e.g., during a clock cycle, etc., from the command controller 102 or the master controller 106, the sub-system controller A immediately, e.g., during the same clock cycle, during a rising edge of the clock cycle, during a falling edge of the clock cycle, etc., sends an (n+1)th recipe set for a corresponding sub-system for processing by the sub-system.

Examples of a manner of communication between a sub-system controller and a corresponding sub-system are provided in the U.S. patent application Ser. No. 14/974,915. For example, the communication protocol is applied by the sub-system controller A to transfer the (n+1)th recipe set for the sub-system A via the link 114A to the sub-system A. As another example, the communication protocol is applied by the sub-system controller B to transfer the (n+1)th recipe set for the sub-system B via the link 114B to the sub-system B.

Upon receiving the (n+1)th recipe set for a sub-system, the sub-system processes the (n+1)th recipe set for the sub-system to facilitate processing of the substrate. For example, when the sub-system A is an RF generator, a processor, e.g., a processor PA, etc., of the RF generator sends an amount of power and a frequency of an RF signal to a driver and amplifier of the RF signal. The driver generates a current signal from the signal received from the processor and the amplifier amplifies the current signal to generate an amplified current signal. The amplified current signal is provided to an RF power supply to generate an RF signal having the amount of power and the frequency. The amount of power and the frequency are within the (n+1)th recipe set for the sub-system A. As another example, when the sub-system B is a pressure sub-system, the processor, e.g., a processor PB, etc., of the pressure controller sends a signal to the driver of the pressure sub-system to drive the motor of the pressure sub-system to rotate the rotor of the motor. The rotation of the rotor controls an amount of movement of the confinement rings to further achieve the amount of pressure within the plasma chamber. The amount of pressure is provided within the (n+1)th recipe set for the sub-system B. As yet another example, when the sub-system C is the temperature sub-system, a temperature processor, e.g., a processor PC, etc., of the temperature controller sends a signal to the driver of the temperature sub-system to generate an amount of current. The driver generates the amount of current and provides the current to the heater. Upon receiving the current, the heater generates heat for heating the plasma chamber to generate an amount of temperature within the plasma chamber. The amount of temperature is provided within the (n+1)th recipe set for the sub-system C.

As another example, when the sub-system A is the gap sub-system, the gap processor, e.g., the processor PA, etc., of the gap controller sends a signal to the driver of the gap sub-system to generate an amount of current, which is provided to the motor of the sub-system A to rotate the rotor of the motor. The rotation of the rotor rotates the one or more rods of the sub-system A to achieve an amount of gap between the upper electrode and the lower electrode. The amount of gap is provided within the (n+1)th recipe set for the sub-system A. As yet another example, when the sub-system B is the gas flow sub-system, the gas flow processor, e.g., the processor PB, etc., of the gas flow controller sends a signal to the driver, which generates a current to drive the motor of the sub-system B. The rotor of the motor rotates to change a position of the valve to further achieve an amount of gas flow from the gas source of the sub-system B to the plasma chamber via the tube of the sub-system B. The amount of gas flow is provided within the (n+1)th recipe set for the sub-system B.

As another example, when the sub-system C is the impedance matching network, the processor, e.g., the processor PC, etc., of the impedance matching controller sends a signal to one of the drivers of the impedance matching network to generate a current. The current is provided to one of the motors of the impedance matching network to rotate a rotor of the motor to further change the area between plates of one of the one or more capacitors of the impedance matching network to achieve a capacitance of the capacitor. Similarly, the processor of the impedance matching controller sends a signal to another one of the drivers of the impedance matching network to generate a current. The current is provided to another one of the motors of the impedance matching network to rotate a rotor of the motor to further change a position of a core of an inductor of the impedance matching network to achieve an inductance of the inductor. The capacitance and the inductance are provided within the (n+1)th recipe set for the sub-system C.

It should be noted that although three sub-systems A, B, and C are shown in FIG. 1A-1, in one embodiment, any number of sub-systems is used. For example, instead of three sub-systems, two sub-systems and corresponding two sub-system controllers are used. As another example, one sub-system and one sub-system controller are used.

In one embodiment, each of the command controller 102, the master controller 106, the sub-system controller A, the sub-system controller B, and the sub-system controller C includes one or more transceivers, which implement a gigabit physical layer. The one or more transceivers are used to send and receive packets.

In some embodiments, a transceiver of a controller is coupled to a processor of the controller.

In several embodiments, functions described herein as being performed by a controller are performed by a processor of the controller.

In various embodiments, the recipe event signal 104 is sent to the sub-system controller A via a first transfer medium similar to the transfer medium 110A. The first transfer medium connects the command controller 102 to the sub-system controller A. Moreover, the recipe event signal 104 is sent to the sub-system controller B via a second transfer medium similar to the transfer medium 110B. The second transfer medium connects the command controller 102 to the sub-system controller B. Also, the recipe event signal 104 is sent to the sub-system controller C via a third transfer medium similar to the transfer medium 110C. The third transfer medium connects the command controller 102 to the sub-system controller C.

In some embodiments, the sub-system controller A sends an acknowledgement of receipt of each recipe set, e.g., the (n+1)th recipe set, etc., via the transfer medium 110A to the master controller 106, and upon receiving the acknowledgement, the master controller 106 sends the acknowledgment to the command controller 102 via the transfer medium 112. Similarly, the sub-system controller B sends an acknowledgement of receipt of a recipe set, e.g., the (n+1)th recipe set, etc., via the transfer medium 110B to the master controller 106, and upon receiving the acknowledgement, the master controller 106 sends the acknowledgment to the command controller 102 via the transfer medium 112. Moreover, the sub-system controller C sends an acknowledgement of receipt of a recipe set, e.g., the (n+1)th recipe set, etc., via the transfer medium 110C to the master controller 106, and upon receiving the acknowledgement, the master controller 106 sends the acknowledgment to the command controller 102 via the transfer medium 112.

In various embodiments, an acknowledgement is sent by a sub-system controller to the master controller 106 after receiving a recipe set. For example, an acknowledgement is sent by a sub-system controller to the master controller 106 after receiving the (n+1)th recipe set, and another acknowledgement is sent by the sub-system controller to the master controller 106 after receiving an (n+2)th recipe set, and so on.

In some embodiments, a recipe set is sent as a payload within a packet, and each recipe set is sent in a different packet. For example, an (n+1)th recipe set is sent in an (n+1)th packet and an (n+2)th recipe set is sent in an (n+2)th packet. The (n+2)th packet is consecutive to the (n+1)th packet.

Figures 1, 1A, 2:
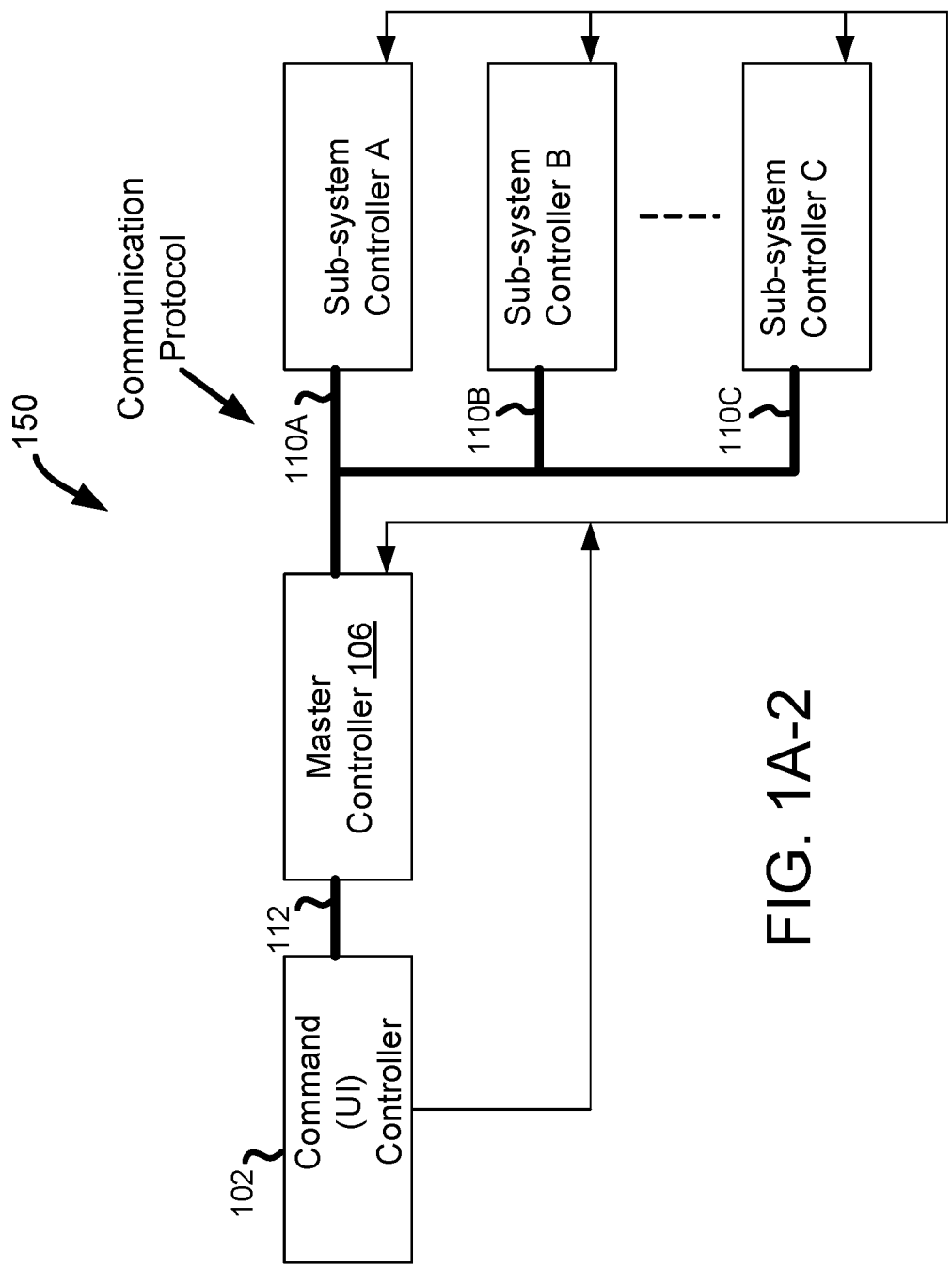

FIG. 1A-2 is a diagram of an embodiment of a system 150 that is similar to the system 100 of FIG. 1A-1 except in the system 150, the sub-systems A, B, and C are not shown. The system 150 is used to illustrate that the links 110A, 110B, and 110C are links that apply the communication protocol. For example, Ethernet packets including the (n+1)th recipe sets for the sub-systems A, B, and C are communicated from the master controller 106 to corresponding sub-system controllers A, B, and C, which are slave controllers.

Figures 1, 1B:
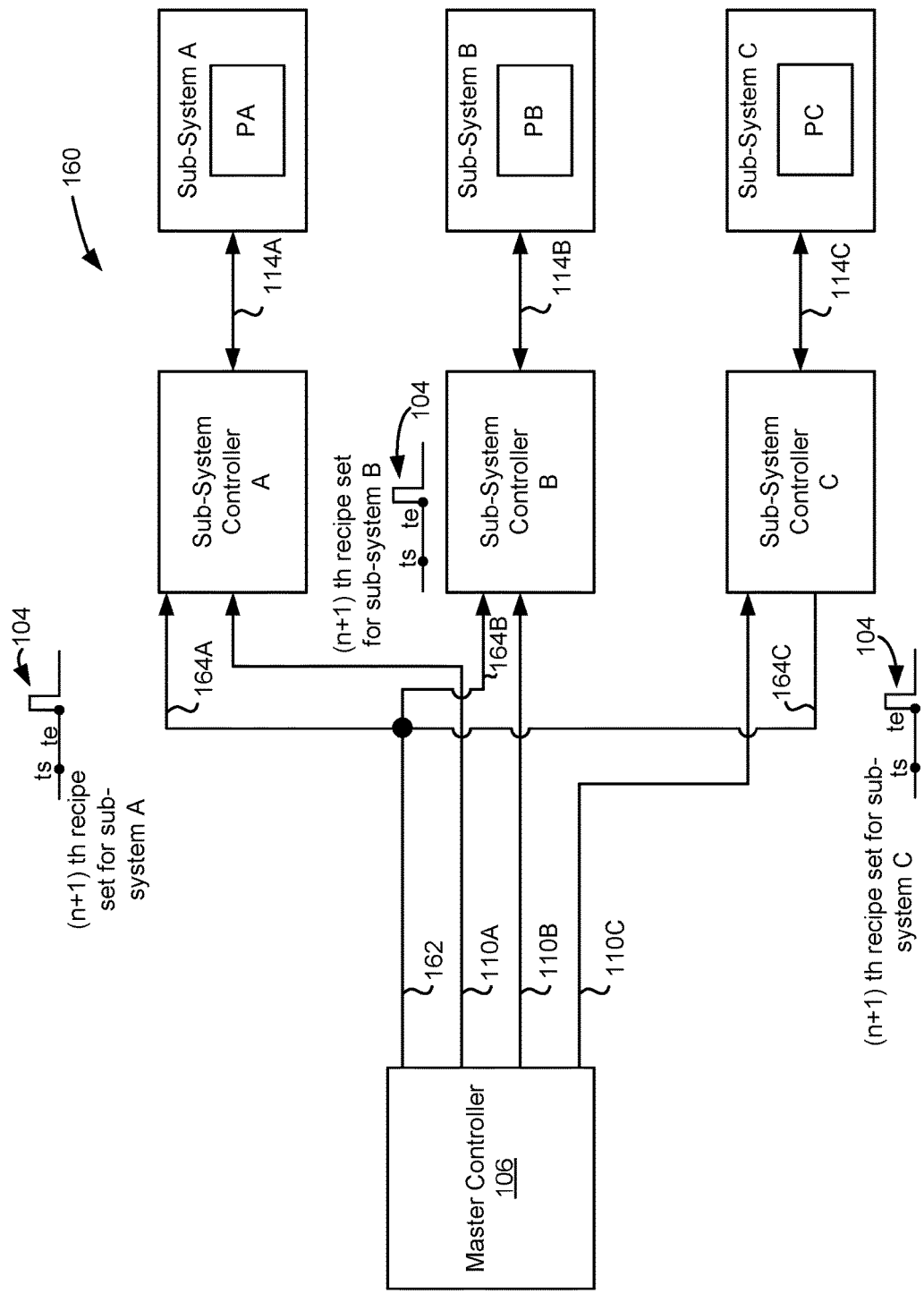

FIG. 1B-1 is a diagram of an embodiment of a system 160 for illustrating synchronization between the sub-system controllers A, B, and C and the master controller 106 without receiving an input signal from the user via the input device. During the first clock cycle, the master controller 106 sends the (n+1)th recipe set for the sub-system A to the sub-system controller A via the transfer medium 110A, sends the (n+1)th recipe set for the sub-system B to the sub-system controller B via the transfer medium 110B, and sends the (n+1)th recipe set for the sub-system C to the sub-system controller C via the transfer medium 110C. For example, the master controller 106 applies the communication protocol to generate a packet that includes the (n+1)th recipe set for the sub-system A and sends the packet via the transfer medium 110A to the sub-system controller A during the first clock cycle, e.g., the cycle C1, etc., of the clock signal. As another example, the master controller 106 applies the communication protocol to generate a packet that includes the (n+1)th recipe set for the sub-system B and sends the packet via the transfer medium 110B to the sub-system controller B during the first clock cycle of the clock signal. Moreover, as yet another example, the master controller 106 applies the communication protocol to generate a packet that includes the (n+1)th recipe set for the sub-system C and sends the packet via the transfer medium 110C to the sub-system controller C during the first clock cycle of the clock signal. As another example, the master controller 106 applies the non-packetized communication protocol to send the (n+1)th recipe set in the serial manner or the parallel manner via the transfer medium 110A to the sub-system controller A, applies the non-packetized communication protocol to send the (n+1)th recipe set in the serial manner or the parallel manner via the transfer medium 110B to the sub-system controller B, and applies the non-packetized communication protocol to send the (n+1)th recipe set in the serial manner or the parallel manner via the transfer medium 110C to the sub-system controller C.

Upon receiving the (n+1)th recipe sets from the master controller 106, the sub-system controllers A, B, and C wait to receive the recipe event signal 104 before sending the (n+1)th recipe sets to the corresponding sub-systems A, B, and C. The master controller 106 generates the recipe event signal 104 and sends the recipe event signal 104 via a communication medium 162 and a communication medium 164A to the sub-system controller A. Moreover, the master controller 106 sends the recipe event signal 104 via the communication medium 162 and a communication medium 164B to the sub-system controller B and sends the recipe event signal 104 via the communication medium 162 and a communication medium 164C to the sub-system controller C. The recipe event signal 104 indicates a time of execution of the (n+1)th recipe sets by the sub-system controllers A, B, and C. The master controller 106 sends the recipe event signal 104 to the sub-system controllers A, B, and C during the second clock cycle, e.g., the clock cycle C2, etc., of the clock signal.

The time of execution of the (n+1)th recipe sets by the sub-system controllers A, B, and C is a time at which the recipe event signal 104 is received by the sub-system controllers A, B, and C from the master controller 106. For example, during a clock cycle, e.g., the clock cycle C2, etc., in which the recipe event signal 104 is received by the sub-system controllers A, B, and C, the sub-system controllers A, B, and C execute the (n+1)th recipe sets.

The sub-system controllers A, B, and C execute the (n+1)th recipe sets by sending the (n+1)th recipe sets to the corresponding sub-systems A, B, and C. For example, in response to receiving the recipe event signal 104, the sub-system controller A immediately sends the (n+1)th recipe set for the sub-system A via the link 114A to the sub-system A. To illustrate, during the clock cycle C2 in which the recipe event signal 104 is received, the sub-system controller A sends the (n+1)th recipe set for the sub-system A via the link 114A to the sub-system A for processing by the sub-system A. As another example, in response to receiving the recipe event signal 104, the sub-system controller B immediately sends the (n+1)th recipe set for the sub-system B via the link 114B to the sub-system B for processing by the sub-system B. To illustrate, during the clock cycle C2 in which the recipe event signal 104 is received, the sub-system controller B sends the (n+1)th recipe set for the sub-system B via the link 114B to the sub-system B. As yet another example, in response to receiving the recipe event signal 104, the sub-system controller C immediately sends the (n+1)th recipe set for the sub-system C via the link 114C to the sub-system C for processing by the sub-system C. To illustrate, during the clock cycle C2 in which the recipe event signal 104 is received, the sub-system controller C sends the (n+1)th recipe set for the sub-system C via the link 114C to the sub-system C.

In various embodiments, the recipe event signal 104 is sent from the master controller 106 to the sub-system controller A via the transfer medium 110A. Moreover, the recipe event signal 104 is sent from the master controller 106 to the sub-system controller B via the transfer medium 110B and is sent from the master controller 106 to the sub-system controller C via the transfer medium 110C.

FIG. 1B-2 is a diagram of an embodiment of a system 180 that is similar to the system 160 of FIG. 1B-1 except in the system 180, the sub-systems A, B, and C are not shown. The system 180 is used to illustrate that the links 110A, 110B, and 110C apply the communication protocol. For example, packets including the (n+1)th recipe sets for the sub-systems A, B, and C are communicated from the master controller 106 to corresponding sub-system controllers A, B, and C, which are the slave controllers. Moreover, the recipe event signal 104 is generated and sent by the master controller 106 to the sub-system controllers A, B, and C.

Figure 1C:
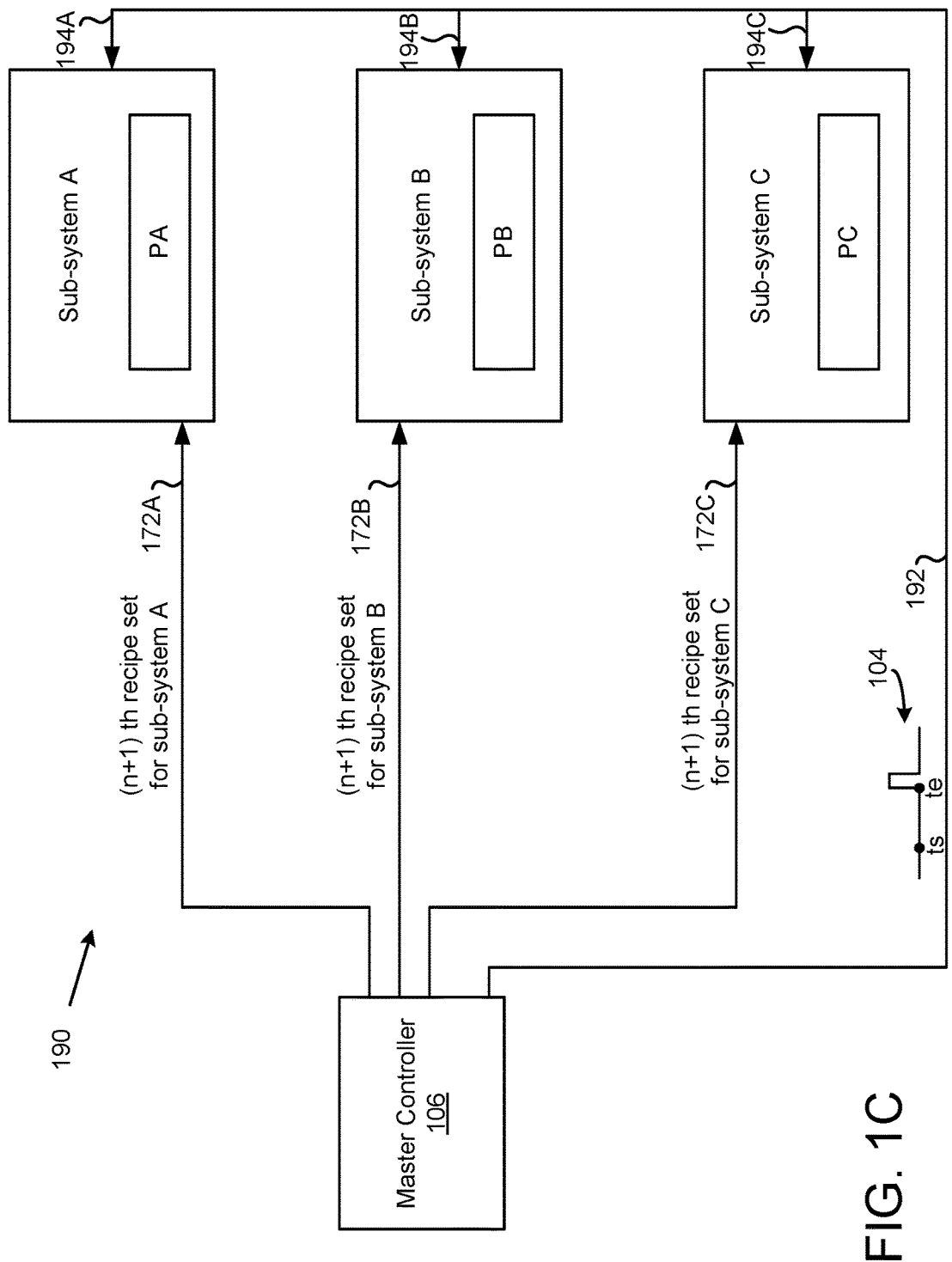
FIG. 1C is a diagram of an embodiment of a system to illustrate synchronization of sub-systems according to a recipe event signal that is received from the master controller.

FIG. 1C is a diagram of an embodiment of a system 190 to illustrate synchronization of the sub-systems A, B, and C according to the recipe event signal that is received from the master controller 106. The master controller 106 is connected to the sub-system A via a transfer medium 172A, is connected to the sub-system B via a transfer medium 172B, and is connected to the sub-system C via a transfer medium 172C. Moreover, the master controller 106 is connected to the sub-system A via a communication medium 192 and a communication medium 194A, is connected to the sub-system B via the communication medium 192 and a communication medium 194B, and is connected to the sub-system C via the communication medium 192 and a communication medium 194C.

The master controller 106 sends the (n+1)th recipe set for execution and processing by the sub-system A to the processor PA of the sub-system A, sends the (n+1)th recipe set for execution and processing by the sub-system B to the processor PB of the sub-system B, and sends the (n+1)th recipe set for execution and processing by the sub-system C to the processor PC of the sub-system C. For example, the master controller 106 sends via the transfer medium 172A the (n+1)th recipe set for the sub-system A by applying the communication protocol for generating a packet that includes the (n+1)th recipe set for the sub-system A and by sending the packet via the transfer medium 172A to the sub-system A. As another example, the master controller 106 sends via the transfer medium 172B the (n+1)th recipe set for the sub-system B by applying the communication protocol for generating a packet that includes the (n+1)th recipe set for the sub-system B and by sending the packet via the transfer medium 172B to the sub-system B. As another example, the master controller 106 sends via the transfer medium 172C the (n+1)th recipe set for the sub-system C by applying the communication protocol for generating a packet that includes the (n+1)th recipe set for the sub-system C and by sending the packet via the transfer medium 172C to the sub-system C. As yet another example, the master controller 106 sends in the serial manner or in the parallel manner via the transfer medium 172A the (n+1)th recipe set for the sub-system A to the sub-system A, sends in the serial manner or in the parallel manner via the transfer medium 172B the (n+1)th recipe set for the sub-system B to the sub-system B, and sends in the serial manner or in the parallel manner via the transfer medium 172C the (n+1)th recipe set for the sub-system C to the sub-system C. The sending of the (n+1)th recipe sets to the sub-systems A, B, and C occurs during a first clock cycle, e.g., a time ts, a clock cycle C1, etc., of the clock signal. For example, the (n+1)th recipe sets are sent during a rising edge or a falling edge of the first clock cycle.

Upon receiving the (n+1)th recipe sets, the processors PA, PB, and PC wait to receive the recipe event signal 104 before executing the recipe sets, e.g., sending the recipe sets and/or parameters identified using the recipe sets to corresponding parts of the sub-systems A, B, and C, etc. For example, during the wait time, the processor PA depacketizes a packet by parsing the packet that includes the (n+1)th recipe set for the sub-system A and extracting the (n+1)th recipe set from the packet. To depacketize a packet, the communication protocol is applied. Moreover, the processor PA identifies one or more parameters from a mapping between one or more variables within the (n+1)th recipe set for the sub-system A and the one or more parameters. The mapping between one or more variables within the (n+1)th recipe set for the sub-system A and the one or more parameters is stored within a memory device of the sub-system A. An example of a parameter includes an amount of current. Examples of a variable includes frequency of an RF signal, and/or power of the RF signal, or pressure within the plasma chamber, or gas flow into the plasma chamber, or temperature within the plasma chamber, or gap between the upper and lower electrodes, or capacitance of a capacitor of the impedance matching network, or inductance of an inductor of the impedance matching network, etc. To illustrate, the processor PA identifies a current to be provided to a driver of the sub-system A to generate an RF signal having an amount of power or a frequency. As another illustration, the processor PA identifies a current to be provided to a driver of the sub-system A to generate an amount of gap between the upper and lower electrodes, or to achieve a pressure within the plasma chamber, or to achieve a temperature within the plasma chamber, or to achieve an amount of gas flow into the plasma chamber, or to achieve a capacitance of a capacitor of the impedance matching network, or to achieve an inductance of an inductor of the impedance matching network.

Similarly, during the wait time, the processor PB depacketizes a packet by parsing the packet that includes the (n+1)th recipe set for the sub-system B and extracting the (n+1)th recipe set from the packet. Moreover, the processor PB identifies one or more parameters from a mapping between one or more variables within the (n+1)th recipe set for the sub-system B and the one or more parameters. The mapping between one or more variables within the (n+1)th recipe set for the sub-system B and the one or more parameters is stored within a memory device of the sub-system B. Also, during the wait time, the processor PC depacketizes a packet by parsing the packet that includes the (n+1)th recipe set for the sub-system C and extracting the (n+1)th recipe set from the packet. Moreover, the processor PC identifies one or more parameters from a mapping between one or more variables within the (n+1)th recipe set for the sub-system C and the one or more parameters. The mapping between one or more variables within the (n+1)th recipe set for the sub-system C and the one or more parameters is stored within a memory device of the sub-system C.

In one embodiment, parsing of a packet by a processor of a sub-system, extracting of the (n+1)th recipe set from the packet, and identification of one or more parameters from a mapping between one or more variables within the extracted (n+1)th recipe set is performed by the processor after receiving the recipe event signal 104 instead of during a wait time for waiting to receive the recipe event signal 104.

In some embodiments in which the non-packetized protocol is applied, there is no need by the processors PA, PB, and PC to perform depacketization to parse a packet and extract an (n+1)th recipe set from the packet.

The master controller 106 generates the recipe event signal 104. The recipe event signal 104 is sent from the master controller 106 via the communication mediums 192 and 194A to the processor PA, is sent from the master controller 106 via the communication mediums 192 and 194B to the processor PB, and is sent from the master controller 106 via the communication mediums 192 and 194C to the processor PC.

The recipe event signal 104 indicates the time of execution to of the (n+1)th recipe sets by the processors PA, PB, and PC. The time of execution is a time at which the recipe event signal 104 is received by the processors PA, PB, and PC. For example, upon receiving the recipe event signal 104, the processors PA, PB, and PC immediately execute the (n+1)th recipe sets by sending signals to corresponding drivers of the sub-systems A, B, and C to drive a part of the sub-system. The sending of the signals to the corresponding drivers is an example of execution of the (n+1)th recipe sets by the processors PA, PB, and PC. To illustrate, upon receiving the recipe event signal 104, the processor PA immediately sends a signal to the driver of the sub-system A so that the sub-system A generates an RF signal having an amount of power and/or frequency. The signal includes a value of a parameter that is identified from the mapping stored within the sub-system A. As another illustration, the recipe event signal 104 acts as a trigger, e.g., an activation signal, etc., for the processor PA to send a signal to the driver of the sub-system A and the signal includes a value of a parameter identified from the mapping stored within the sub-system A. As an illustration, during the same clock cycle, e.g., a clock cycle C2, etc., in which the recipe event signal 104 is received by the processor PA and/or is sent by the master controller 106 to the processor PA, the processor PA sends a signal to the driver of the sub-system A. The signal includes a value of a parameter that is identified from the mapping stored within the sub-system A.

As another illustration, upon receiving the recipe event signal 104, the processor PB sends a signal to the driver of the sub-system B to achieve an amount of pressure or temperature within the plasma chamber. The signal includes a value of a parameter that is identified from the mapping stored within the sub-system B. As another illustration, the recipe event signal 104 acts as a trigger, e.g., an activation signal, etc., for the processor PB to send a signal to the driver of the sub-system B and the signal includes a value of a parameter identified from the mapping stored within the sub-system B. As another illustration, during the same clock cycle, e.g., the clock cycle C2, etc., in which the recipe event signal 104 is received by the processor PB, the processor PB sends a signal to the driver of the sub-system B. The signal includes a value of a parameter that is identified from the mapping stored within the sub-system B.

As yet another illustration, upon receiving the recipe event signal 104, the processor PC sends a signal to the driver of the sub-system C to achieve an amount of gap between the upper electrode and the lower electrode. The signal includes a value of a parameter that is identified from the mapping stored within the sub-system C. As another illustration, the recipe event signal 104 acts as a trigger, e.g., an activation signal, etc., for the processor PC to send a signal to the driver of the sub-system C and the signal includes a value of a parameter identified from the mapping stored within the sub-system C. As another illustration, during the same clock cycle, e.g., the clock cycle C2, etc., in which the recipe event signal 104 is received by the processor PC, the processor PC sends a signal to the driver of the sub-system C. The signal includes a value of a parameter that is identified from the mapping stored within the sub-system C.

The signals from the processors PA, PB, and PC are sent to the corresponding drivers of the sub-systems A, B, and C during a second clock cycle, e.g., a clock cycle C2, a time te, etc. The second clock cycle follows the first clock cycle. For example, the first clock cycle precedes the second clock cycle. As another example, the second clock cycle occurs after one or more clock cycles that are preceded by the first clock cycle. The one or more clock cycles precede the second clock cycle. The second clock cycle and any clock cycles between the first and second clock cycles are of the clock signal.

The recipe event signal 104 directs execution of an (n+1)th recipe set. For example, at a time, e.g. during a clock cycle, etc., the recipe event signal 104 is received from the master controller 106 by a processor of a sub-system, the processor sends a parameter identified based on an (n+1)th recipe set to the driver of the sub-system for processing. To illustrate, a driver of a sub-system processes the signal received from a processor of the sub-system by driving a motor to achieve a pressure within the plasma chamber, or an amount of gas flow into the plasma chamber, or a temperature within the plasma chamber, or a gap between the upper and lower electrodes, or a capacitance of a capacitor of the impedance matching network, or an inductance of an inductor of the impedance matching network. As another illustration, a driver of an RF generator processes the signal received from a digital signal processor (DSP) of the RF generator by generating a drive signal for facilitating generation of an RF signal having an amount of power and a frequency. The RF signal is generated by an RF power supply of the RF generator. The RF power supply is connected to the driver. In some embodiments, the RF power supply is connected to the driver via an amplifier, which amplifies the current signal generated by the driver, and provides the amplified current signal to the RF power supply. The RF power supply generates an RF signal upon receiving the amplified current signal.

The recipe event signal 104 when received by a processor of a sub-system is indicative of immediate activation of execution of the recipe set by the processor. For example, when the recipe event signal 104 is received by the processor PA at a time, e.g., during a clock cycle, etc., the from the master controller 106, the processor PA immediately, e.g., during the same clock cycle, etc., sends a signal to a driver of the sub-system for achieving a variable extracted from the (n+1)th recipe set for the sub-system A.

It should be noted that in some embodiments, there is no relation between "first clock cycle" described above with reference to FIGS. 1A-1 and 1B-1 and "first clock cycle" described above with reference to FIG. 1C. Similarly, there is no relation between "second clock cycle" described above with reference to FIGS. 1A-1 and 1B-1 and "second clock cycle" described above with reference to FIG. 1C. The "first clock cycle" as described with reference to FIG. 1C is independent from the "first clock cycle" described with reference to FIGS. 1A-1 and 1B-1, and similarly, and the "second clock cycle" as described with reference to FIG. 1C is independent from the "second clock cycle" described with reference to FIGS. 1A-1 and 1B-1.

In an embodiment, instead of receiving and sending described above as being performed by the processors PA, PB, and PC, a transceiver of each of the sub-systems A, B, and C performs the receiving and sending, and the processors PA, PB, and PC performs the remaining operations described above with respect to identifying a parameter from a memory device of the sub-system based on a variable received within an (n+1)th recipe set. The transceiver of a sub-system is connected to a processor of the sub-system. The transceiver implements a physical layer for implementing the communication protocol.

In various embodiments, the recipe event signal 104 is sent from the master controller 106 to the sub-system A via the transfer medium 172A. Moreover, the recipe event signal 104 is sent from the master controller 106 to the sub-system B via the transfer medium 172B and is sent from the master controller 106 to the sub-system C via the transfer medium 172C.

In some embodiments, the processor PA sends an acknowledgement of receipt of each recipe set, e.g., the (n+1)th recipe set, etc., via the transfer medium 172A to the master controller 106. Similarly, the sub-system B sends an acknowledgement of receipt of a recipe set via the transfer medium 172B to the master controller 106. Moreover, the sub-system controller C sends an acknowledgement of receipt of a recipe set via the transfer medium 172C to the master controller 106.

In various embodiments, an acknowledgement is sent by a sub-system to the master controller 106 after receiving a recipe set. For example, an acknowledgement is sent by a sub-system to the master controller 106 after receiving the (n+1)th recipe set, and another acknowledgement is sent by the sub-system to the master controller 106 after receiving an (n+2)th recipe set, and so on.

Figure 1D:
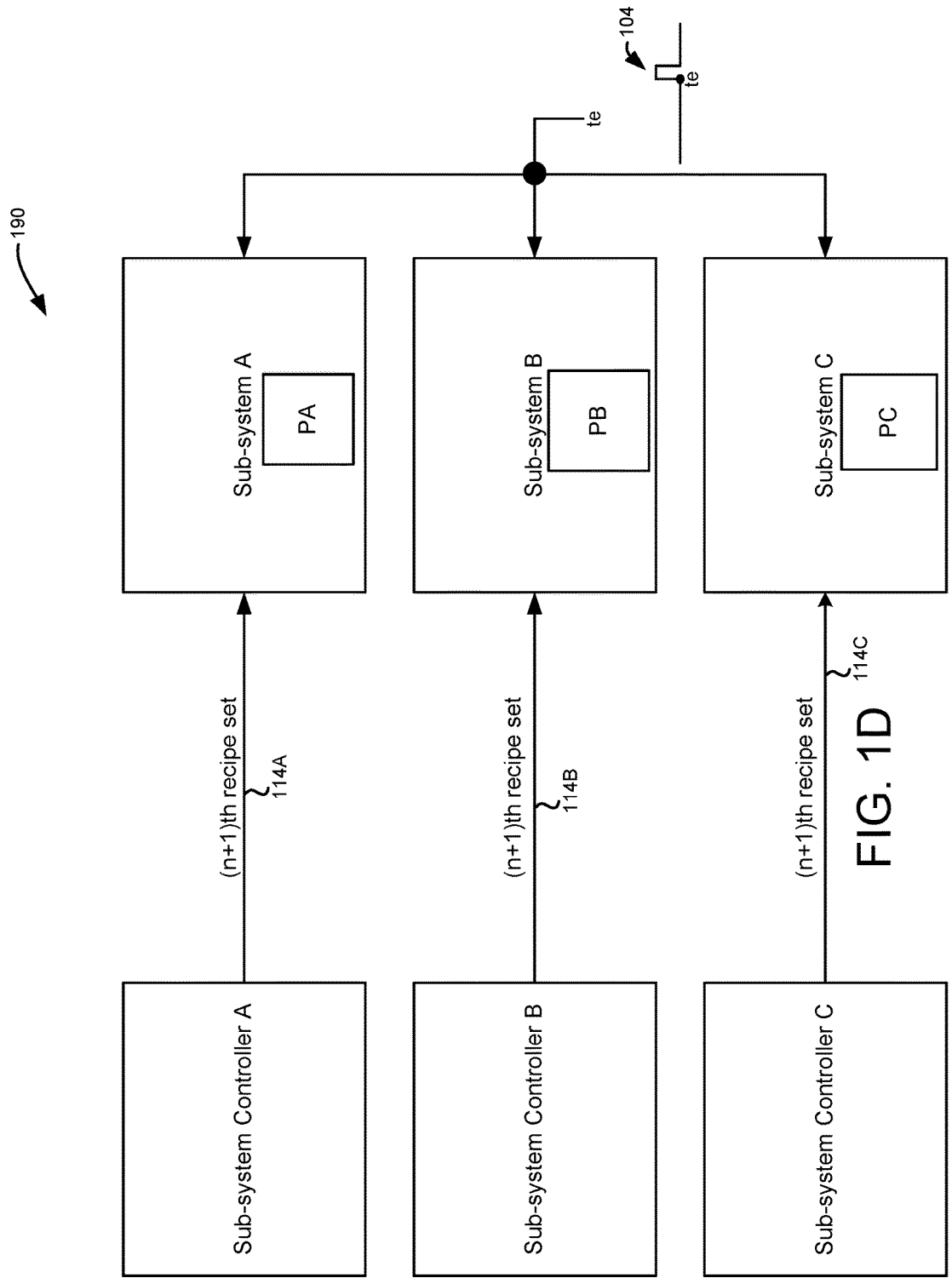
FIG. 1D is a diagram of an embodiment of a system to illustrate synchronization between the sub-system controllers and the sub-systems.

FIG. 1D is a diagram of an embodiment of a system 190 to illustrate synchronization between the sub-system controllers A, B, and C and the sub-systems A, B, and C. The processors PA, PB, and PC receive the (n+1)th recipe sets from the corresponding sub-system controllers A, B, and C during a first clock cycle, e.g., a cycle C1, a time ts, etc. For example, the processor PA receives the (n+1)th recipe set for the sub-system A from the sub-system controller A, the processor PB receives the (n+1)th recipe set for the sub-system B from the sub-system controller B, and processor PC receives the (n+1)th recipe set for the sub-system C from the sub-system controller C.

In some embodiments, the sub-system controllers A, B, and C are provided the clock signal from another controller, e.g., the master controller 106, the command controller 102 (FIG. 1A-1), etc., or the clock source, e.g., an oscillator, an oscillator with a phase-locked loop, etc., to synchronize sending of the (n+1)th recipe sets by the sub-system controllers A, B, and C to the corresponding sub-systems A, B, and C. In various embodiments, the clock source is located within one of the sub-system controllers A, B, and C and is connected via one or more communication mediums to remaining ones of the sub-system controllers A, B, and C.

The processors PA, PB, and PC wait to send one or more parameters identified from the (n+1)th recipe sets to the corresponding drivers of the sub-systems A, B, and C until the recipe event signal 104 is received from the other controller, e.g., the master controller 104 or the command controller 102, etc. It should be noted that the other controller sends the recipe event signal 104 to the processor PA via one or more communication mediums, to the processor PB via one or more communication mediums, and to the processor PC via one or more communication mediums. Upon receiving the recipe event signal 104, the processor PA sends a signal that includes a parameter identified using the mapping stored in the memory device of the sub-system A to the driver of the sub-system A. For example, during a second clock cycle, e.g., a clock cycle C2, a time te, etc., in which the recipe event signal 104 is received by the processor PA, the processor PA sends a signal including a parameter identified using the mapping stored in the sub-system A to the driver of the sub-system A. Moreover, upon receiving the recipe event signal 104, the processor PB sends a signal that includes a parameter identified using the mapping stored in the memory device of the sub-system B to the driver of the sub-system B. For example, during the second clock cycle in which the recipe event signal 104 is received by the processor PB, the processor PB sends a signal including a parameter identified using the mapping stored in the sub-system B to the driver of the sub-system B. Also, upon receiving the recipe event signal 104, the processor PC sends a signal that includes a parameter identified using the mapping stored in the memory device of the sub-system C to the driver of the sub-system C. For example, during the second clock cycle in which the recipe event signal 104 is received by the processor PC, the processor PC sends a signal including a parameter identified using the mapping stored in the sub-system C to the driver of the sub-system C. The recipe event signal 104 acts as a trigger, e.g., activation, etc., for sending a signal including a value of a parameter from each of the processors PA, PB, and PC to the corresponding drivers of the corresponding sub-systems A, B, and C.

It should be noted that in some embodiments, there is no relation between the "first clock cycle" described above with reference to FIGS. 1A-1 and 1B-1 or FIG. 1C and the "first clock cycle" described above with reference to FIG. 1D. Similarly, there is no relation between the "second clock cycle" described above with reference to FIGS. 1A-1 and 1B-1 or 1C and the "second clock cycle" described above with reference to FIG. 1D. The "first clock cycle" as described with reference to FIG. 1D is independent from the "first clock cycle" described with reference to FIGS. 1A-1 and 1B-1 or FIG. 1C, and similarly, the "second clock cycle" as described with reference to FIG. 1D is independent from the "second clock cycle" described with reference to FIGS. 1A-1 and 1B-1 or 1C.

In some embodiments, the processor PA sends an acknowledgement of receipt of each recipe set, e.g., the (n+1)th recipe set, etc., via the transfer medium 114A to the sub-system controller A. Similarly, the processor PB sends an acknowledgement of receipt of a recipe set via the transfer medium 114B to the sub-system controller B. Moreover, the processor PC sends an acknowledgement of receipt of a recipe set via the transfer medium 114C to the sub-system controller C.

In various embodiments, an acknowledgement is sent by a sub-system to a corresponding sub-system controller that is connected to the sub-system. The acknowledgement is sent after receiving each recipe set. For example, an acknowledgement is sent by the processor PA of the sub-system A to the sub-system controller A after receiving the (n+1)th recipe set, and another acknowledgement is sent by the processor PA to the sub-system controller A after receiving an (n+2)th recipe set, and so on.

Figure 1E:
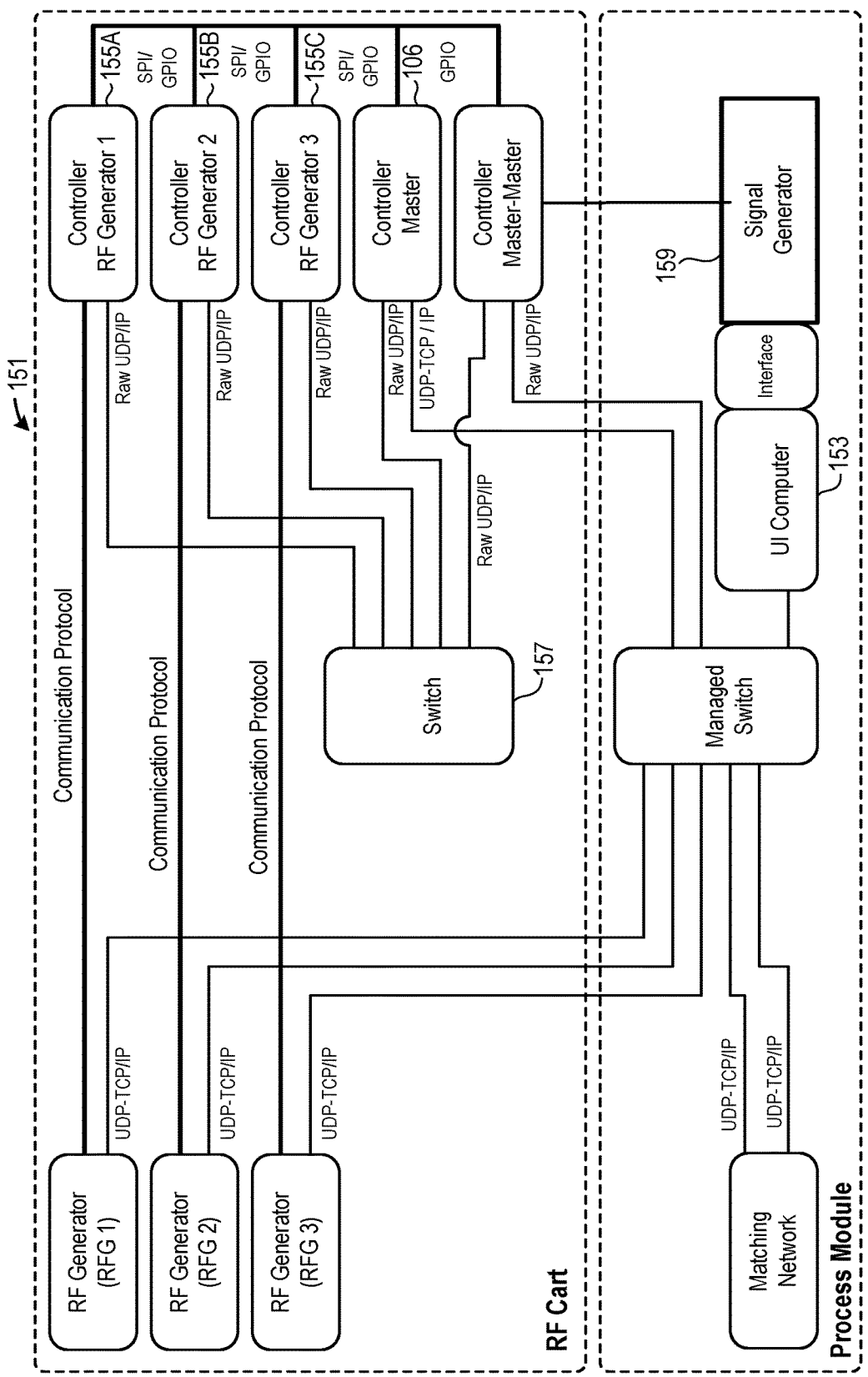
FIG. 1E is a diagram of an embodiment of a system for illustrating use of a user interface (UI) computer to achieve synchronization between the master controller and RF generator controllers.

FIG. 1E is a diagram of an embodiment of a system 151 for illustrating synchronization between a user interface (UI) computer 153 and RF generator controllers 155A, 155B, and 155C. The UI computer 153 is an example of the computing device 108 of FIG. 1A-1. Moreover, the RF generator controller 155A is an example of the sub-system controller A (FIG. 1A-1), the RF generator controller 155B is an example of the sub-system controller B (FIG. 1A-1), and the RF generator controller 155C is an example of the sub-system controller C (FIG. 1A-1). The system 151 further includes RF generators 1, 2, and 3. The RF generator 1 is labeled as RFG1, the RF generator 2 is labeled as RFG2, and the RF generator 3 is labeled as RFG3. The RF generator 1 is an example of the x MHz RF generator, the RF generator 2 is an example of the y MHz RF generator, and the RF generator 3 is an example of the z MHz RF generator.

Functioning of the system 151 is illustrated with reference to FIG. 2B. As shown in FIG. 2B, the UI computer 153 sends the (n+1)th recipe sets by applying the Ethernet protocol and a Transmission Control Protocol (TCP)/Internet Protocol (IP) or a User Datagram Protocol (UDP)/IP via a transfer medium to the master controller 106 via a master-master controller. In one embodiment, the system 151 excludes the master-master controller. In an embodiment, the master controller 106 performs functions performed by the master-master controller.

The master controller 106 applies a TCP/IP protocol or a UDP/IP protocol and the Ethernet protocol to send the (n+1)th recipe set for the RF generator 1 to the RF generator controller 155A, to send the (n+1)th recipe set for the RF generator 2 to the RF generator controller 155B, and to send the (n+1)th recipe set for the RF generator 3 to the RF generator controller 155C. For example, with reference back to FIG. 1E, the (n+1)th recipe set for the RF generator 1 is sent from the master controller 106 to the RF generator controller 155A via a switch 157. As another example, as shown in FIG. 1E, the (n+1)th recipe set for the RF generator 2 is sent from the master controller 106 to the RF generator controller 155B via the switch 157. As yet another example, as shown in FIG. 1E, the (n+1)th recipe set for the RF generator 3 is sent from the master controller 106 to the RF generator controller 155C via the switch 157. An example of the switch 157 is described in the U.S. patent application Ser. No. 14/974,915.

Referring to FIG. 2B, upon receiving the (n+1)th recipe sets from the master controller 106, the RF generator controllers 155A, 155B, and 155C wait to receive the recipe event signal from the UI computer 153 before sending the (n+1)th recipe sets to the corresponding RF generators 1, 2, and 3. Referring back to FIG. 1E, a signal generator 159, e.g., a digital pulse signal generator, an analog pulse signal generator, a processor, etc., is coupled to the UI computer 153 via an input/output interface (I/O). The signal generator 159 generates a general-purpose I/O (GPIO) signal, e.g., a digital signal, an analog signal, etc., and provides the signal to the RF generator controllers 155A, 155B, and 155C via the master-master controller and corresponding GPIO pins of the corresponding RF generator controllers 155A, 155B, and 155C. The GPIO signal is an example of the recipe event signal 104. In some embodiments, the signal generator 159 is located within the UI computer 153. In some embodiments, the GPIO signal is generated when an input, e.g., a selection, a click, etc., is received by the UI computer 153 via the input device from the user. The input device is a peripheral connected to the UI computer 153.

With reference to FIG. 2B, immediately upon receiving the GPIO signal, e.g., during the same clock cycle of receiving the GPIO signal, etc., the RF generator controller 155A applies the Ethernet protocol and the UDP/IP protocol to send the (n+1)th recipe set for the RF generator 1 to the RF generator 1, the RF generator controller 155B applies the Ethernet protocol and the UDP/IP protocol to send the (n+1)th recipe set for the RF generator 2 to the RF generator 2, and the RF generator controller 155C applies the Ethernet protocol and the UDP/IP protocol to send the (n+1)th recipe set for the RF generator 3 to the RF generator 3.

Figures 1, 2A:
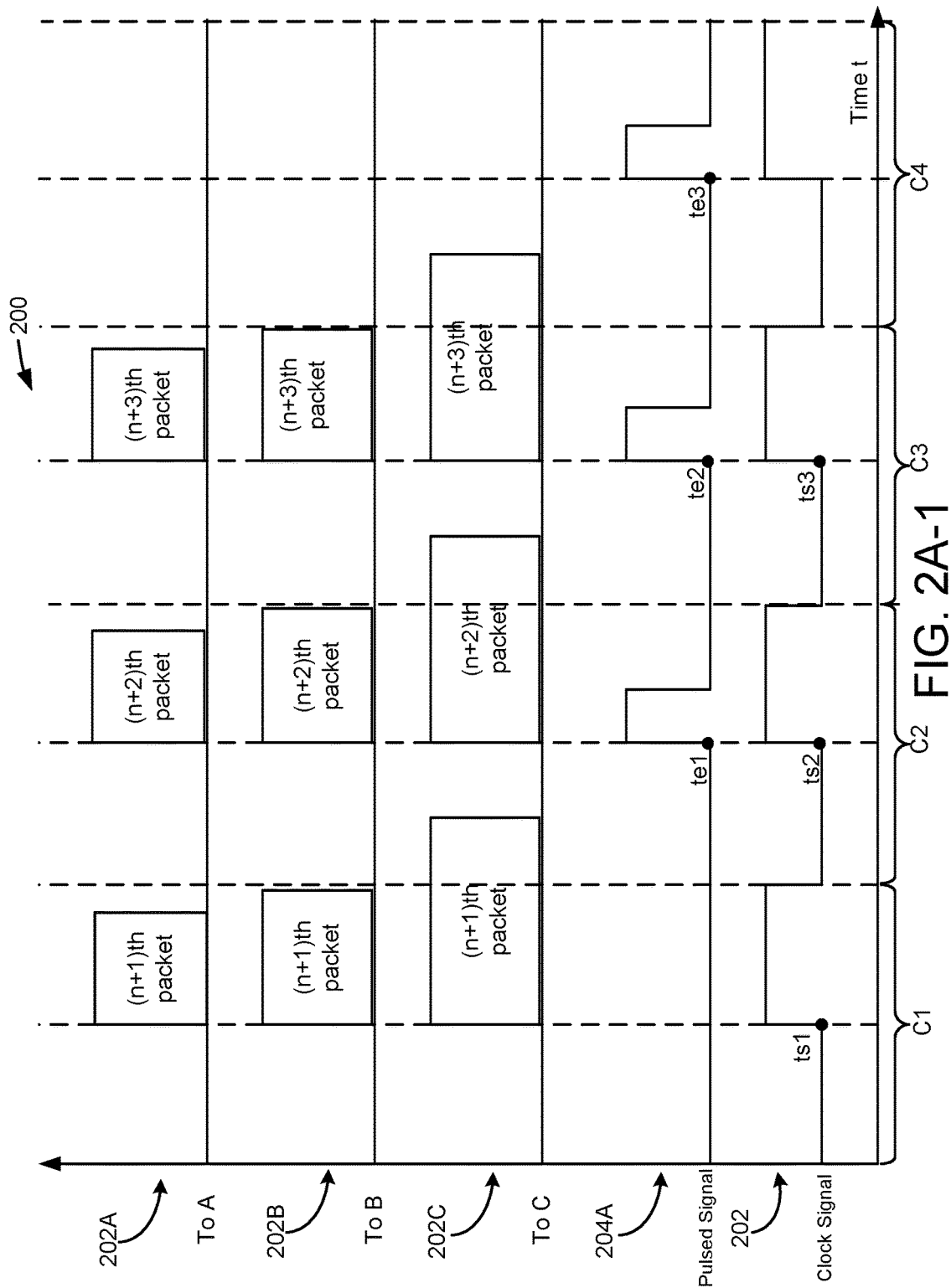
Figures 2, 2A:
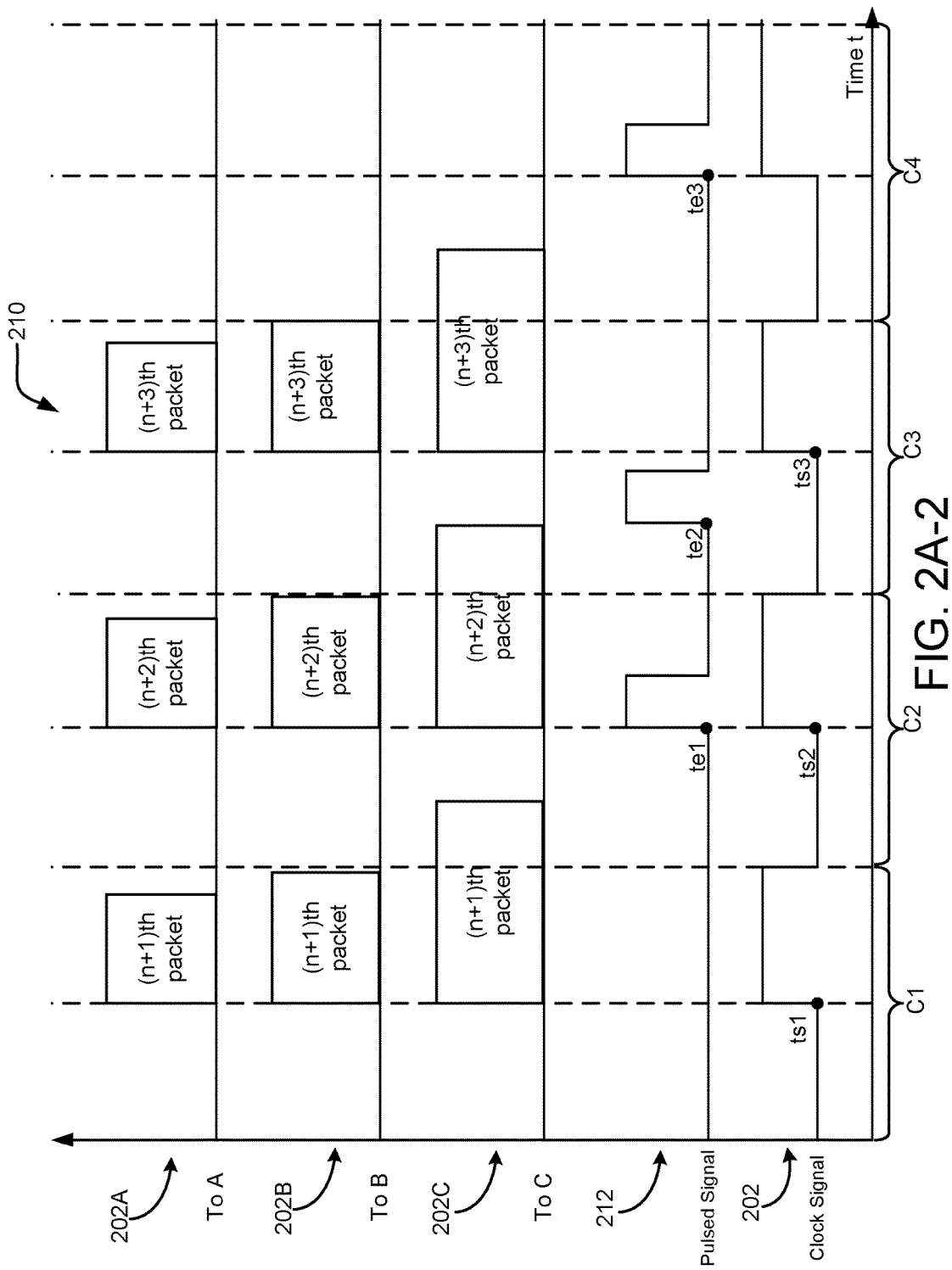
Figure 2B:
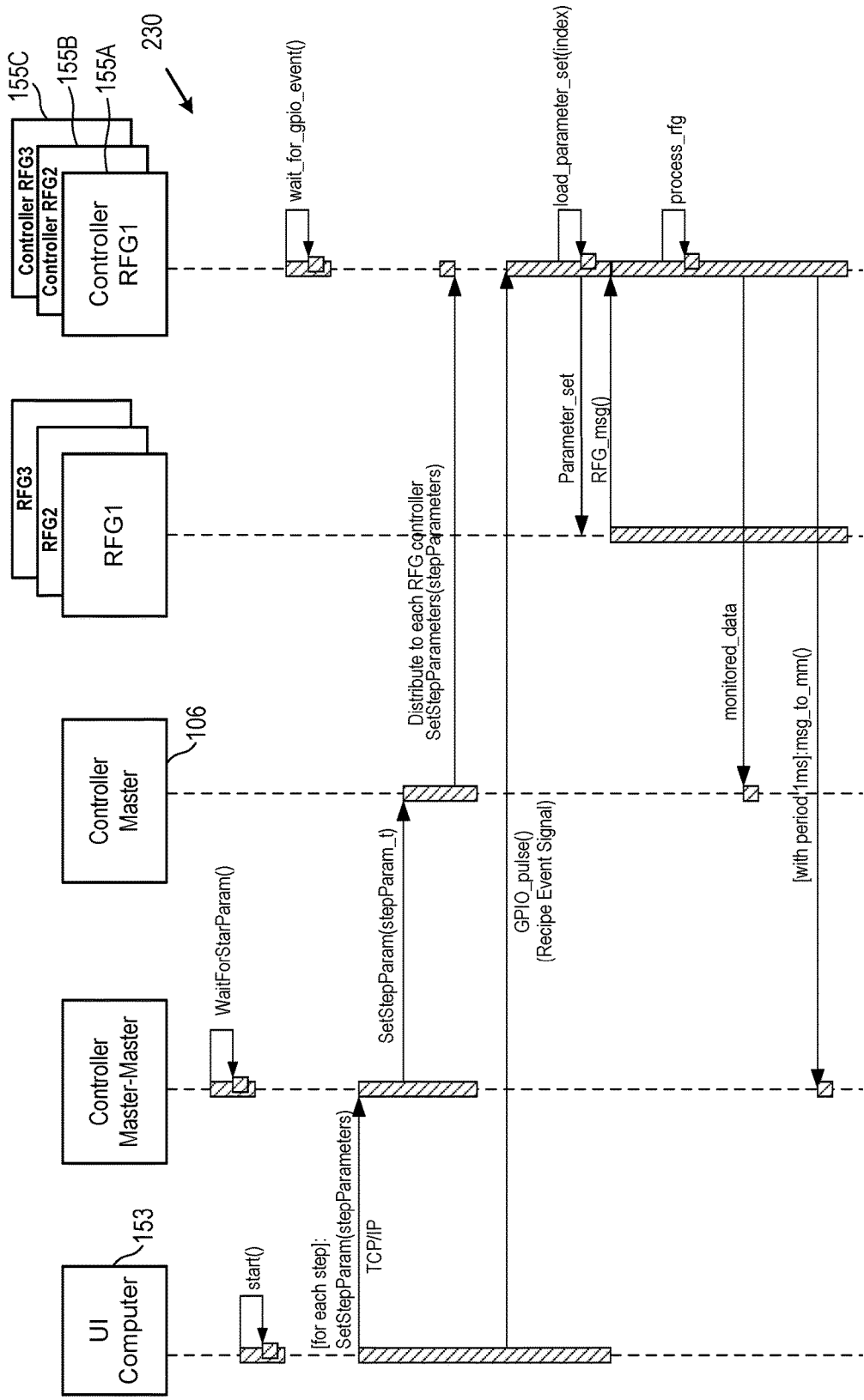
FIG. 2B is an embodiment of a timing diagram use to illustrate functioning of the system of FIG. 1E.

FIG. 2A-1 is an embodiment of a timing diagram 200 to illustrate synchronization between sending the (n+1)th recipe sets to controllers and time of execution of the recipe sets by the controllers. The timing diagram 200 shows a series 202A in which an (n+1)th packet, an (n+2)th packet, and an (n+3)th packet are sent from the master controller 106 to the sub-system controller A (FIG. 1A-1). Moreover, the timing diagram 200 shows a series 202B in which an (n+1)th packet, an (n+2)th packet, and an (n+3)th packet are sent from the master controller 106 to the sub-system controller B (FIG. 1A-1). Also, the timing diagram 200 shows a series 202C in which an (n+1)th packet, an (n+2)th packet, and an (n+3)th packet are sent from the master controller 106 to the sub-system controller C (FIG. 1A-1).

In one embodiment that is illustrated with reference to FIG. 1C, the series 202A of packets is sent from the master controller 106 to the sub-system A, the series 202B of packets is sent from the master controller 106 to the sub-system B, and the series 202C of packets is sent from the master controller 106 to the sub-system C.

In an embodiment that is illustrated with reference to FIG. 1D, the series 202A of packets is sent from the sub-system controller A to the sub-system A, the series 202B of packets is sent from the sub-system controller B to the sub-system B, and the series 202C of packets is sent from the sub-system controller C to the sub-system C.

The timing diagram 200 further includes a pulsed signal 204A, which is an example of the recipe event signal 104. The timing diagram 200 includes a clock signal 202, which is generated by the master controller 106 or the command controller 102 or the clock source located outside the master controller 106 or the clock source located outside the command controller 102 (FIG. 1A-1).

In some embodiments, a pulse at the time te1 of the pulsed signal 204A is an example of the recipe event signal 104.

At a time ts1, the (n+1)th packets for the sub-systems A, B, and C are sent by one or more controllers as is described herein. At a time of execution te1, a digital pulse is received by one or more controllers as is described herein to indicate that the (n+1)th packets be executed. Moreover, at a time ts2, which coincides with the time te1, the (n+2)th packets for the sub-systems A, B, and C are sent by the one or more controllers as is described herein. During a time of execution te2, a digital pulse is received by one or more controllers as is described herein to indicate that the (n+2)th packets be executed by the one or more controllers as is described herein. Furthermore, at a time ts3, which coincides with the time te2, the (n+3)th packets for the sub-systems A, B, and C are sent by one or more controllers as is described herein. During a time of execution te3, a digital pulse is received by one or more controllers as is described herein to indicate that the (n+3)th packets be executed by the one or more controllers.

In some embodiments, a processor, e.g., the processor PA, or the processor PB, or the processor PC, etc., is located within a controller.

It should be noted that the time ts1 occurs during a first clock cycle C1 of the clock signal 202, the times te1 and ts2 occur during a second clock cycle C2 of the clock signal 202, the times te2 and ts3 occur during a third clock cycle C3 of the clock signal 202, and the time te3 occurs during a fourth clock cycle C4 of the clock signal 202.

It should further be noted that in some embodiments, the first clock cycle described with reference to each of the FIGS. 1A-1, 1B-1, 1C, and 1D is an example of the first clock cycle described with reference to FIG. 2A-1. Moreover, in these embodiments, the second clock cycle described with reference to each of the FIGS. 1A-1, 1B-1, 1C, and 1D is an example of the second clock cycle described with reference to FIG. 2A-1.

It should be noted that in various embodiments, a size of packets shown in FIG. 2A-1 is different. For example, the (n+1)th packet in the series 202A for the sub-system A has a smaller size or a bigger size payload than a size of payload in the (n+1)th packet in the series 202B for the sub-system B. Moreover, the (n+1)th packet in the series 202B for the sub-system B has a smaller size or a bigger size payload than a size of payload in the (n+1)th packet in the series 202C for the sub-system C.

FIG. 2A-2 is an embodiment of a timing diagram 210 to illustrate that a time of execution of a packet by a controller varies from a time at which the packet is received by the controller to a later time at which a digital pulse indicating that the packet be executed is received. The digital pulse is of a digital pulse signal 212, which is an example of the recipe event signal 104. In some embodiments, a pulse at the time te1 of the pulsed signal 212 is an example of the recipe event signal 104.

As shown in the timing diagram, a time of execution te2 shown in FIG. 2A-2 occurs before the time of execution te2 shown in the timing diagram 200 (FIG. 2A-1). For example, the time of execution te2 shown in FIG. 2A-2 does not coincide with the time ts3 and occurs before the time ts3 occurs. As another example, the time of execution te2 occurs between a time the (n+2)th packet is received and an end of reception of the (n+3)th packet.

In some embodiments, the time of execution te1 shown in FIG. 2A-2 occurs before the time of execution te1 shown in the timing diagram 200 (FIG. 2A-1). For example, the time of execution te1 shown in FIG. 2A-2 does not coincide with the time ts2 and occurs before the time ts2 occurs. As another example, the time of execution te1 occurs between a time the (n+1)th packet is received and an end of reception of the (n+2)th packet.

In some embodiments, a digital pulse of the pulsed signal 212 is sent within a pre-determined time interval after receiving acknowledgements for reception of recipe sets from all controllers who have received the recipe sets. For example, a digital pulse of the pulsed signal 212 is sent between receiving acknowledgements for reception of (n+1) th recipe sets and receiving acknowledgements for reception of (n+2)th recipe sets. To illustrate, the command controller 102 sends a first digital pulse of the recipe event signal 104 to the master controller 106 at the time te1 within the pre-determined time interval after receiving acknowledgements of receipt of the (n+1)th recipe sets from the sub-system controllers A, B, and C via the master controller 106. The (n+1)th recipe sets are received by the sub-system controllers A, B, and C from the master controller 106. The acknowledgements of receipt of the (n+1)th recipe sets are sent from the sub-system controllers A, B, and C to the master controller 106, which sends the acknowledgements of receipt of the (n+1)th recipe sets to the command controller 102. To illustrate, an acknowledgement of receipt of a recipe set is sent from a sub-system controller A via a transfer medium to the master controller 106, which sends the acknowledgement via the transfer medium 112 to the command controller 102. Moreover, the command controller 102 sends a second digital pulse of the recipe event signal 104 to the master controller 106 at the time te2 within the pre-determined time interval after receiving acknowledgements of receipt of the (n+2)th recipe sets from the sub-system controllers A, B, and C via the master controller 106. The (n+2)th recipe sets are received by the sub-system controllers A, B, and C from the master controller 106. The acknowledgements of receipt of the (n+2)th recipe sets are sent from the sub-system controller A, B, and C to the master controller 106, which send the acknowledgements of receipt of the (n+2)th recipe to the command controller 102. In some embodiments, the acknowledgements of receipt of recipe sets are sent from the sub-system controller A to the command controller 102 via the communications mediums 122A, 124, and 126, the acknowledgements of receipt of recipe sets are sent from the sub-system controller B to the command controller 102 via the communications mediums 122B, 124, and 126, and the acknowledgements of receipt of recipe sets are sent from the sub-system controller C to the command controller 102 via the communications mediums 122C, 124, and 126.

As another illustration, the master controller 106 sends a first digital pulse of the recipe event signal 104 to a sub-system controllers A, B, and C at the time te1 within the pre-determined time interval after receiving acknowledgements of receipt of the (n+1)th recipe sets from the sub-system controllers A, B, and C. Moreover, the master controller 106 sends a second digital pulse of the recipe event signal 104 to the sub-system controllers A, B, and C at the time te2 within the pre-determined time interval after receiving acknowledgements of receipt of the (n+2)th recipe sets from the sub-system controllers A, B, and C. In some embodiments, an acknowledgement is sent from a sub-system controller to the master controller 106 via a transfer medium that connects the sub-system controller to the master controller 106. In various embodiments, an acknowledgement is sent from a sub-system controller to the master controller 106 via one or more communication mediums that connect the sub-system controller to the master controller 106. As another illustration, the master controller 106 sends a first digital pulse of the recipe event signal 104 to the processors PA, PB, and PC at the time te1 within the pre-determined time interval after receiving acknowledgements of receipt of the (n+1)th recipe sets from the processors PA, PB, and PC. Moreover, the master controller 106 sends a second digital pulse of the recipe event signal 104 to the processors PA, PB, and PC at the time te2 within the pre-determined time interval after receiving acknowledgements of receipt of the (n+2)th recipe sets from the processors PA, PB, and PC. In some embodiments, an acknowledgement is sent from a sub-system to the master controller 106 via a transfer medium that connects the sub-system to the master controller 106. In various embodiments, an acknowledgement is sent from a sub-system to the master controller 106 via one or more communication mediums that connect the sub-system to the master controller 106. As yet another illustration, a sub-system controller sends a first digital pulse of the recipe event signal 104 to a processor of a sub-system at the time te1 within the pre-determined time interval after receiving an acknowledgement of receipt of the (n+1)th recipe set from the processor. Moreover, the sub-system controller sends a second digital pulse of the recipe event signal 104 to the processor at the time te2 within the pre-determined time interval after receiving an acknowledgement of receipt of the (n+2)th recipe set from the processor.

In some embodiments, the pre-determined time interval is received from the user via the input device. For example, the pre-determined time interval is a time interval between receipt of acknowledgments of receipt of two consecutive packets, e.g., (n+1)th packet and (n+2)th packet, etc.

In various embodiments, a digital pulse of the pulsed signal 212 is sent from a sending controller without the sending controller receiving one or more acknowledgements from corresponding one or more receiving controllers and based on a pre-determined amount of time taken to send a recipe set from the sending controller to the one or more receiving controllers. The one or more receiving controllers are coupled to the sending controller. For example, the sending controller is provided by the user via the input device that the pre-determined amount of time taken to communicate a recipe set from the sending controller to the one or more receiving controllers is x units, e.g., x microseconds or x milliseconds or x nanoseconds, etc. After every x units, the sending controller sends a pulse of the pulsed signal 212 to the one or more receiving controllers. An example of the sending controller is the command controller 102 when the one or more receiving controllers are the sub-system controllers A, B, and C. Another example of the sending controller is the master controller 106 when the one or more receiving controllers are the sub-system controllers A, B, and C. Yet another example of the sending controller is the master controller 106 when the one or more receiving controllers are the processors PA, PB, and PC.

In various embodiments, the pre-determined amount of time taken to send a recipe set from the sending controller to the one or more receiving controllers is determined by the sending controller during a learning routine. For example, the sending controller sends packets of various sizes, e.g., having different bits of recipe sets as payload, etc., to the one or more receiving controllers. The sending controller determines a longest amount of time taken to send the largest sized packet among the packets of the various sizes and determines the longest amount of time to be the pre-determined amount of time.

In several embodiments, the time te2 is between the time ts3 and a time of reception of the (n+2)th packets by the one or more receiving controllers.

FIG. 2B is a timing diagram 230 that is described above with reference to FIG. 1E.

Figure 3A:
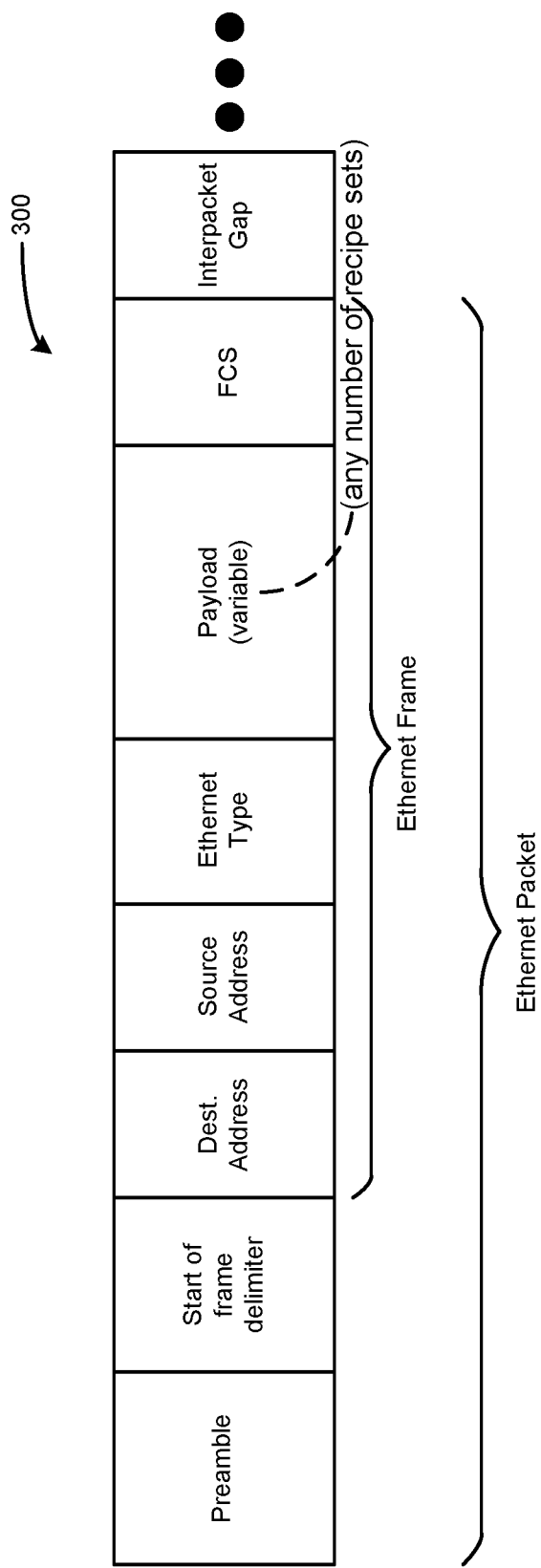
FIG. 3A is a diagram of an embodiment of an Ethernet packet.

FIG. 3A is a diagram of an embodiment of an Ethernet packet 300. The Ethernet packet 300 includes a preamble field, a start of frame delimiter field, a destination media access control (MAC) address field, a source MAC address field, an Ethernet type field, a payload field, a frame check sequence (FCS) field, and an interpacket gap. The preamble and start of frame delimiter fields are filled in to indicate a start of an Ethernet frame. The Ethernet frame includes the destination MAC address field, the source MAC address field, the Ethernet type field, the payload field, and the FCS field.

The MAC destination address field includes an address that uniquely identifies a network interface, e.g., a network interface of the master controller 106, or a network interface of the sub-system controller A, or a network interface of the sub-system controller B, or a network interface of the sub-system controller C, or a network interface of the sub-system A, or a network interface of the sub-system B, or a network interface of the sub-system C, etc., that is to receive the Ethernet packet 300. Examples of the network interface include a network interface controller, a network interface card, etc.

The network interface of the master controller 106 is connected to one or more transfer mediums and to the processor of the master controller 106. For example, the network interface of the master controller 106 is connected to the transfer mediums 110A, 110B, and 110C (FIG. 1A-1). As another example, the network interface of the master controller 106 is connected to the transfer mediums 164A, 164B, and 164C (FIG. 1B-1). As yet another example, the network interface of the master controller 106 is connected to the transfer mediums 172A, 172B, and 172C (FIG. 1C).

Similarly, the network interface of a sub-system controller is connected to one or more transfer mediums and to the processor of the sub-system controller. For example, the network interface of the sub-system controller A is connected to the transfer mediums 110A and 114A (FIG. 1A-1), the network interface of the sub-system controller B is connected to the transfer mediums 110B and 114B (FIG. 1A-1), and the network interface of the sub-system controller C is connected to the transfer mediums 110C and 114C (FIG. 1A-1).

Moreover, the network interface of a sub-system is connected to one or more transfer mediums and to the processor of the sub-system. For example, the network interface of the sub-system A is connected to the transfer medium 114A (FIG. 1A-1), the network interface of the sub-system B is connected to the transfer medium 114B (FIG. 1A-1), and the network interface of the sub-system C is connected to the transfer medium 114C (FIG. 1A-1). As another example, the network interface of the sub-system A is connected to the transfer medium 172A (FIG. 1C), the network interface of the sub-system B is connected to the transfer medium 172B (FIG. 1C), and the network interface of the sub-system C is connected to the transfer medium 172C (FIG. 1C).

In one embodiment, the network interface is implemented within a controller, e.g., the master controller 106, or the sub-system controller A, or the sub-system controller B, or the sub-system controller C, or the processor PA, or the processor PB, or the processor PC, etc., described herein.

The MAC source address field includes an address that uniquely identifies a network interface that sends the Ethernet packet 300. The Ethernet type field includes data to indicate either a length of the payload or a protocol, e.g., Internet Protocol version 4, Apple Talk™, etc., that is encapsulate in the payload. The payload field can accommodate a different number of bits, e.g., ranging from 42 octets to 1500 octets, etc., of one or more recipe sets, e.g., the (n+1)th recipe set, the (n+2)th recipe set, the (n+3)th recipe set, etc. The FCS field is used to check integrity of the frame. The interpacket gap is an idle time between two consecutive packets.

Figure 3B:
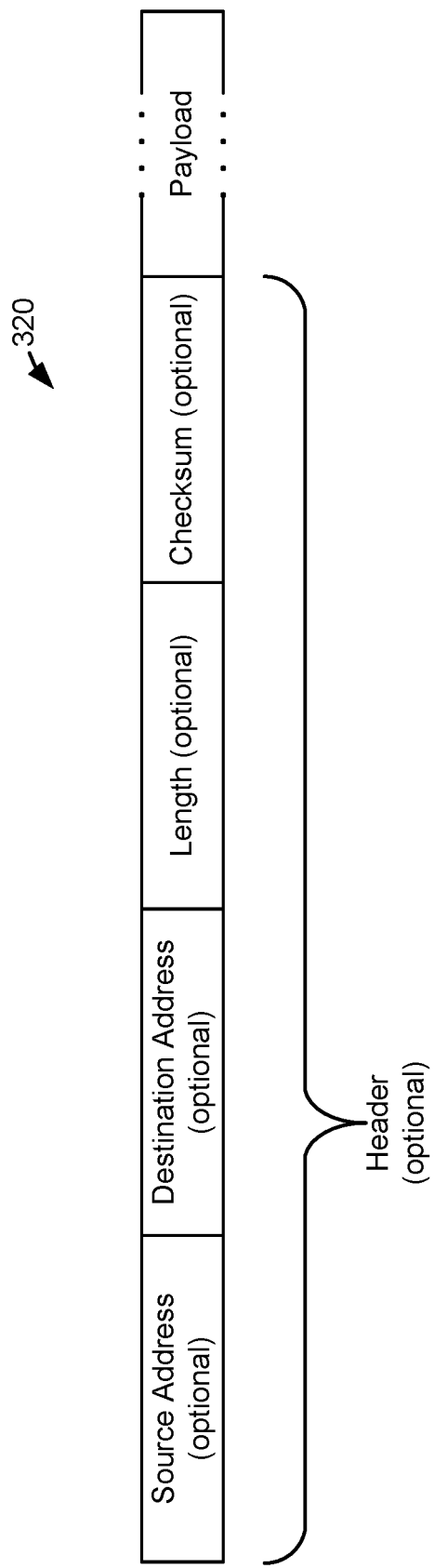
FIG. 3B is a diagram to illustrate a packet, in accordance with an embodiment described in the present disclosure.

FIG. 3B is a diagram of an embodiment to illustrate a packet 320, e.g., a datagram, etc. The packet 320 includes a header field and a payload field, e.g., a field that includes a recipe set, etc. The header field includes a field for an identity of a source address, e.g., an address of a network interface, etc., from which the packet 320 is sent, a field for an identity of a destination address, e.g., an address of a network interface, etc., designated to receive the packet 320, a field for a combined length of the header and of a payload attached to the header, and a field for a checksum value.

In various embodiments, the packet 320 is customized, e.g., generated using the customized communication protocol, etc., to exclude the source address field for identifying the source address and the destination address field for identifying the destination address. In a point-to-point communication, there is no need for identifying the source address and the destination address. The exclusion increases data rate between the master controller 106 and a sub-system controller connected to the master controller 106, or between the sub-system controller and a sub-system connected to the sub-system controller, or between the master controller and a sub-system connected to the master controller.

In some embodiments, the header is customized, e.g., generated using the customized communication protocol, etc., to exclude the field for the checksum value and/or the field for the combined length of the header and of the payload. The exclusion increases data rate between the master controller 106 and a sub-system controller connected to the master controller 106, or between the sub-system controller and a sub-system connected to the sub-system controller, or between the master controller and a sub-system connected to the master controller.

In various embodiments, the checksum value is generated by a network interface sending the packet 320. The checksum value is generated from the payload of the packet 320, or the header of the packet 320, or a combination thereof. The checksum value is compared to another checksum value that is calculated by a receiver, e.g., a destination network interface, etc., of the packet 320 to determine whether the payload and/or a header of the packet 320 changed during a transfer from a sending network interface to a receiving network interface.

In some embodiments, a datagram, e.g., a UDP datagram, etc., is embedded within an IP packet, which is further embedded within an Ethernet packet.

In various embodiments, the packet 320 is customized, e.g., generated using the customized protocol, etc., such that the fields are in different positions than that shown in FIG. 3B. For example, the field for payload is before the field for the length. As another example, the field for the destination address is before the field for the source address or after the field for the length. The customized protocol is applied by a physical layer that generates one or more of customized packets.

Figure 4:
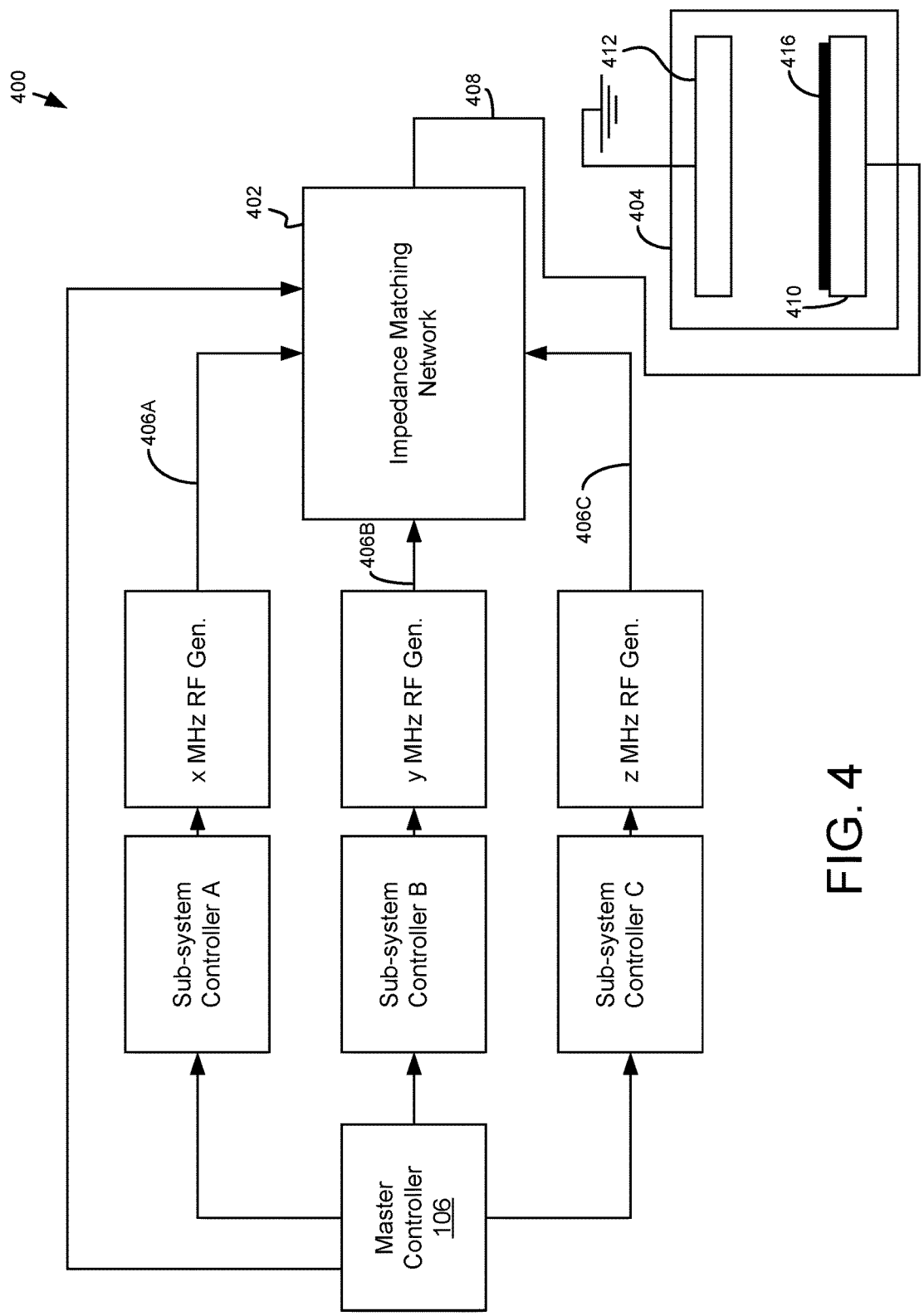
FIG. 4 is a diagram of an embodiment of a plasma processing system.

FIG. 4 is a diagram of an embodiment of a plasma processing system 400. The plasma processing system 400 includes the master controller 106, the x MHz RF generator, the y MHz RF generator, the z MHz RF generator, the sub-system controller A, the sub-system controller B, and the sub-system controller C. Moreover, the plasma processing system 400 includes an impedance matching network 402 and a plasma chamber 404.

In one embodiment, instead of the x MHz RF generator, a kHz RF generator is used.

Upon receiving the (n+1)th recipe set, the x MHz RF generator generates an RF signal. For example, the RF signal generated by the x MHz RF generator has an amount of power and/or an amount of frequency prescribed in the (n+1)th recipe set received by the x MHz RF generator. Similarly, upon receiving the (n+1)th recipe set, the y MHz RF generator generates an RF signal and upon receiving the (n+1)th recipe set, the z MHz RF generator generates an RF signal. For example, the RF signal generated by the y MHz RF generator has an amount of power and/or an amount of frequency prescribed in the (n+1)th recipe set received by the y MHz RF generator. As another example, the RF signal generated by the z MHz RF generator has an amount of power and/or an amount of frequency prescribed in the (n+1)th recipe set received by the z MHz RF generator. The RF signals are provided via corresponding RF cables 406A, 406B, and 406C to the impedance matching network 402. The impedance matching network 402 matches an impedance of a load connected to an output of the impedance matching network 402 with an impedance of a source connected to one or more inputs of the impedance matching network 402 to generate a modified RF signal. For example, the impedance matching network 402 matches an impedance of the plasma chamber 404 and an RF transmission line 408 with an impedance of the RF cables 406A, 406B, and 406C, the x MHz RF generator, the y MHz RF generator, and the z MHz RF generator.

The modified RF signal is sent via the RF transmission line 408 to a lower electrode 410 of the plasma chamber 404. The lower electrode 410 is a part of a chuck, e.g., an electrostatic chuck (ESC), etc. An upper electrode 412 of the plasma chamber 404 faces and is located opposite to the lower electrode 410. Each of the upper electrode 412 and the lower electrode 410 is made of a metal, e.g., aluminum, alloy of aluminum, etc.

When the process gas is supplied to the plasma chamber 404 and the modified RF signal is supplied to the lower electrode, plasma is stricken or is maintained within the plasma chamber 404 for processing a wafer 416 that rests on an upper surface of the lower electrode 410.

Figure 5:
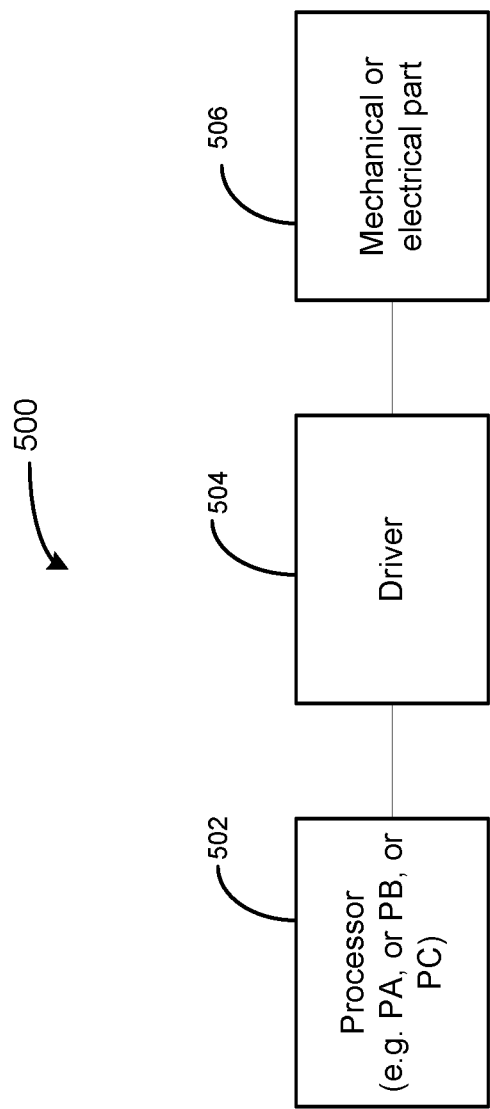
FIG. 5 is a diagram of an embodiment of a system to illustrate a sub-system.

FIG. 5 is a diagram of an embodiment of a system to illustrate a sub-system 500, e.g., the sub-system A, or the sub-system B, or the sub-system C, etc. The sub-system 500 includes a processor 502, e.g., the processor PA, or the processor PB, or the processor PC, etc. The processor 502 is connected to a driver 504, e.g., one or more transistors, one or more current generating devices, etc. The driver is connected to a mechanical or an electrical part 506. Examples of the part 506 include a motor or an amplifier.

When the sub-system 500 is an RF generator, the part 506 includes an amplifier which is connected to an RF power supply. Moreover, when the sub-system 500 is the pressure sub-system, or the gap sub-system, or the gas flow sub-system, or the cooling liquid flow sub-system, the part 506 is a motor.

The processor 502 generates a signal that is provided to the driver 504. Upon receiving the signal from the processor 502, the driver 504 generates a drive signal, which is provided to the part 506 to operate the part 506. When the part 506 is a motor, the motor controls an amount by which a valve of the cooling flow sub-system is open or close, or an amount by which a valve of the gas flow sub-system is open or close, or an amount by which the confinement rings are open or close, or an amount of gap between the upper electrode 412 (FIG. 4) and the lower electrode 410 (FIG. 4). When the part 506 is a heater, the heater heats when the driver 504 supplies the current signal to the heater. When the part 506 is an amplifier, the amplifier generates an amplified signal upon receiving the current signal from the driver 504, and the amplified signal is provide to an RF power supply to generate an RF signal.

Figure 6:
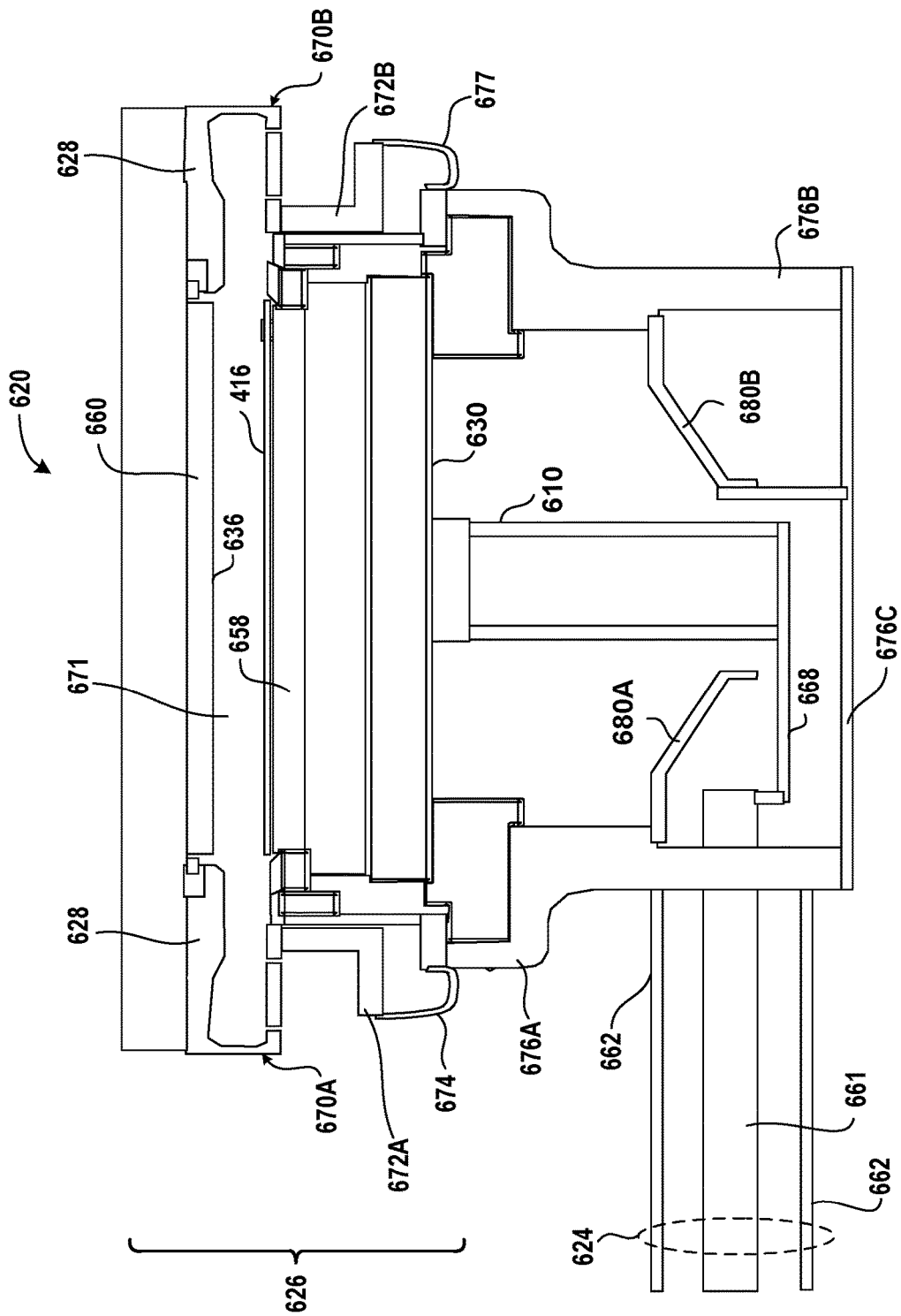
FIG. 6 is a diagram of an embodiment of a plasma chamber.

FIG. 6 is a diagram of an embodiment of a system to illustrate a plasma chamber 626, which is an example of the plasma chamber 404 (FIG. 4). The system includes a plasma reactor 620 and an RF transmission line 624, which is an example of the RF transmission line 408 (FIG. 4). The RF transmission line 624 is connected to the plasma reactor 620. The RF transmission line 624 includes an RF rod 661 and an RF tunnel 662. The RF rod 661 is used to facilitate a transfer of the modified RF signal received from the impedance matching network 402 (FIG. 4).

The plasma reactor 620 includes the plasma chamber 626 and an RF cylinder 610, which is connected to the RF rod 661 via an RF strap 668. The plasma reactor 620 further includes RF straps 674 and 677, a ground shield 680 and a bottom electrode housing 676.

The plasma chamber 626 includes an upper electrode 660, an upper electrode extension 628, a C-shroud 670, a ground ring 672, and a chuck assembly. The chuck assembly includes a chuck 658 and a facility plate 630. The upper electrode 660 is an example of the upper electrode 412 (FIG. 4). The substrate 416 is placed on top of the chuck 658 for processing the substrate 416. Examples of processing the substrate 416 include cleaning the substrate 416, or etching the substrate 416, or etching an oxide on top of the substrate 416, or depositing materials, e.g., oxides, dioxides, photo resist materials, etc., on the substrate 416, or a combination thereof.

The C-shroud 670 includes slots that are used to control pressure within the plasma chamber 626. For example, the slots are opened to increase gas flow through the slots to decrease gas pressure in a gap 671 of the plasma chamber 626. The slots are closed to decrease the gas flow to increase gas pressure in the gap 671.

In various embodiments, the bottom electrode housing 676 is of any shape, e.g., cylindrical, square, polygonal, etc.

In various embodiments, the RF cylinder 610 is not a cylinder and has a polygonal shape, e.g., a rectangular shape, a square shape, etc.

The upper electrode extension 628 surrounds the upper electrode 660. The C-shroud 670 includes portions 670A and 670B. The ground ring 672 includes a ground ring portion 672A and another ground ring portion 672B. The bottom electrode housing 676 includes a bottom electrode housing portion 676A, another bottom electrode housing portion 676B, and yet another bottom electrode housing portion 676C. Each bottom electrode housing portion 676A and 676B forms a side wall of the bottom electrode housing 676. The bottom electrode housing 676C forms a bottom wall of the bottom electrode housing 676. The ground shield 680 includes a shield portion 680A and another shield portion 680B.

A top surface of the chuck 658 faces a bottom surface 636 of the upper electrode 660. The plasma chamber 626 is surrounded by the upper electrode 660 and the upper electrode extension 628. The plasma chamber 626 is further surrounded by the C-shroud 670, and the chuck 658.

The ground ring 672 is located below the C-shroud 670. In some embodiments, the ground ring 672 is located below and adjacent to the C-shroud 670. The return RF strap 674 is connected to the ground ring portion 672A and the return RF strap 677 is connected to the ground ring portion 672B. The return RF strap 674 is connected to the bottom electrode housing portion 676A and the return RF strap 677 is connected to the bottom electrode housing portion 676B. The bottom electrode housing portion 676A is connected to the shield portion 680A and the bottom electrode housing portion 676B is connected to the shield portion 680B. The shield portion 680A is connected via the bottom electrode housing portion 676A to the RF tunnel 662 and the shield portion 680B is connected via the bottom electrode housing portion 676C to the grounded RF tunnel 662.

In some embodiments, the bottom electrode housing portion 676 is a cylinder that surrounds the RF cylinder 610. The RF cylinder 610 is a medium for passage of the modified RF signal. The modified RF signal is supplied via the RF rod 661, the RF strap 668, and the RF cylinder 610 to the lower electrode of the chuck 658 to generate or maintain plasma within the gap 671 of the plasma chamber 626. The gap 671 is formed between the upper electrode 660 and the lower electrode of the chuck 658.

In some embodiments, the upper electrode 660 is grounded.

In various embodiments, instead of the RF strap 668, a number of RF straps are used to connect the RF cylinder 610 to the RF rod 661.

In one embodiment, instead of the C-shroud 670, the confinement rings are provided to control exit of gases from the plasma chamber 626 to further control pressure within the plasma chamber 626.

It should be noted that in some of the above-described embodiments, the modified RF signal is provided to the lower electrode 410 (FIG. 4) and the upper electrode 412 (FIG. 4) is grounded. In various embodiments, the modified RF signal is provided to the upper electrode 412 and the lower electrode 410 is grounded.

In one embodiment, functions described herein as being performed by one processor are performed by multiple processors, e.g., are distributed between multiple processors.

In an embodiment, functions described herein as being performed by one controller are performed by multiple controllers, e.g., are distributed between multiple controllers.

In some embodiments, functions described herein as being performed by multiple controllers are performed by a controller.

Embodiments, described herein, may be practiced with various computer system configurations including hand-held hardware units, microprocessor systems, microprocessor-based or programmable consumer electronics, minicomputers, mainframe computers and the like. The embodiments, described herein, can also be practiced in distributed computing environments where tasks are performed by remote processing hardware units that are linked through a computer network.

In some embodiments, a controller is part of a system, which may be part of the above-described examples. The system includes semiconductor processing equipment, including a processing tool or tools, chamber or chambers, a platform or platforms for processing, and/or specific processing components (a wafer pedestal, a gas flow system, etc.). The system is integrated with electronics for controlling its operation before, during, and after processing of a semiconductor wafer or substrate. The electronics is referred to as the "controller," which may control various components or subparts of the system. The controller, depending on processing requirements and/or a type of the system, is programmed to control any process disclosed herein, including a delivery of process gases, temperature settings (e.g., heating and/or cooling), pressure settings, vacuum settings, power settings, RF generator settings, RF matching circuit settings, frequency settings, flow rate settings, fluid delivery settings, positional and operation settings, wafer transfers into and out of a tool and other transfer tools and/or load locks connected to or interfaced with the system.

Broadly speaking, in a variety of embodiments, the controller is defined as electronics having various integrated circuits, logic, memory, and/or software that receive instructions, issue instructions, control operation, enable cleaning operations, enable endpoint measurements, and the like. The integrated circuits include chips in the form of firmware that store program instructions, digital DSPs, chips defined as ASICs, PLDs, one or more microprocessors, or microcontrollers that execute program instructions (e.g., software). The program instructions are instructions communicated to the controller in the form of various individual settings (or program files), defining operational parameters for carrying out a process on or for a semiconductor wafer. The operational parameters are, in some embodiments, a part of a recipe defined by process engineers to accomplish one or more processing steps during the fabrication of one or more layers, materials, metals, oxides, silicon, silicon dioxide, surfaces, circuits, and/or dies of a wafer.

The controller, in some embodiments, is a part of or coupled to a computer that is integrated with, coupled to the system, otherwise networked to the system, or a combination thereof. For example, the controller is in a "cloud" or all or a part of a fab host computer system, which allows for remote access for wafer processing. The controller enables remote access to the system to monitor current progress of fabrication operations, examines a history of past fabrication operations, examines trends or performance metrics from a plurality of fabrication operations, to change parameters of current processing, to set processing steps to follow a current processing, or to start a new process.

In some embodiments, a remote computer (e.g. a server) provides process recipes to the system over a computer network, which includes a local network or the Internet. The remote computer includes a user interface that enables entry or programming of parameters and/or settings, which are then communicated to the system from the remote computer. In some examples, the controller receives instructions in the form of settings for processing a wafer. It should be understood that the settings are specific to a type of process to be performed on a wafer and a type of tool that the controller interfaces with or controls. Thus as described above, the controller is distributed, such as by including one or more discrete controllers that are networked together and working towards a common purpose, such as the fulfilling processes described herein. An example of a distributed controller for such purposes includes one or more integrated circuits on a chamber in communication with one or more integrated circuits located remotely (such as at a platform level or as part of a remote computer) that combine to control a process in a chamber.

Without limitation, in various embodiments, the system includes a plasma etch chamber, a deposition chamber, a spin-rinse chamber, a metal plating chamber, a clean chamber, a bevel edge etch chamber, a physical vapor deposition (PVD) chamber, a chemical vapor deposition (CVD) chamber, an atomic layer deposition (ALD) chamber, an atomic layer etch (ALE) chamber, an ion implantation chamber, a track chamber, and any other semiconductor processing chamber that is associated or used in fabrication and/or manufacturing of semiconductor wafers.

It is further noted that although the above-described operations are described with reference to a parallel plate plasma chamber, e.g., a capacitively coupled plasma chamber, etc., in some embodiments, the above-described operations apply to other types of plasma chambers, e.g., a plasma chamber including an inductively coupled plasma (ICP) reactor, a transformer coupled plasma (TCP) reactor, conductor tools, dielectric tools, a plasma chamber including an electron cyclotron resonance (ECR) reactor, etc. For example, the x MHz RF generator, the y MHz RF generator, and the z MHz RF generator are coupled via an impedance matching network to an inductor within the ICP plasma chamber.

As noted above, depending on a process operation to be performed by the tool, the controller communicates with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

With the above embodiments in mind, it should be understood that some of the embodiments employ various computer-implemented operations involving data stored in computer systems. These computer-implemented operations are those that manipulate physical quantities.

Some of the embodiments also relate to a hardware unit or an apparatus for performing these operations. The apparatus is specially constructed for a special purpose computer. When defined as a special purpose computer, the computer performs other processing, program execution or routines that are not part of the special purpose, while still being capable of operating for the special purpose.

In some embodiments, the operations, described herein, are performed by a computer selectively activated, or are configured by one or more computer programs stored in a computer memory, or are obtained over a computer network. When data is obtained over the computer network, the data may be processed by other computers on the computer network, e.g., a cloud of computing resources.

One or more embodiments, described herein, can also be fabricated as computer-readable code on a non-transitory computer-readable medium. The non-transitory computer-readable medium is any data storage hardware unit, e.g., a memory device, etc., that stores data, which is thereafter read by a computer system. Examples of the non-transitory computer-readable medium include hard drives, network attached storage (NAS), ROM, RAM, compact disc-ROMs (CD-ROMs), CD-recordables (CD-Rs), CD-rewritables (CD-RWs), magnetic tapes and other optical and non-optical data storage hardware units. In some embodiments, the non-transitory computer-readable medium includes a computer-readable tangible medium distributed over a network-coupled computer system so that the computer-readable code is stored and executed in a distributed fashion.

Although some method operations, described above, were presented in a specific order, it should be understood that in various embodiments, other housekeeping operations are performed in between the method operations, or the method operations are adjusted so that they occur at slightly different times, or are distributed in a system which allows the occurrence of the method operations at various intervals, or are performed in a different order than that described above.

It should further be noted that in an embodiment, one or more features from any embodiment described above are combined with one or more features of any other embodiment without departing from a scope described in various embodiments described in the present disclosure.

Although the foregoing embodiments have been described in some detail for purposes of clarity of understanding, it will be apparent that certain changes and modifications can be practiced within the scope of appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:
sending by a command controller to a master controller a recipe set;
sending by the master controller the recipe set for execution by a sub-system controller of a plasma system, wherein said sending the recipe set from the master controller to the sub-system controller is performed during a first clock cycle of a clock signal;
generating by the command controller a recipe event signal;
sending by the command controller to the sub-system controller the recipe event signal indicating a time of execution of the recipe set by the sub-system controller, wherein the time of execution occurs during a second clock cycle that follows the first clock cycle, wherein the second clock cycle is of the clock signal;
sending by the command controller to the master controller an additional recipe set; and
sending by the master controller the additional recipe set to the sub-system controller for execution by the sub-system controller of the plasma system, wherein said sending the additional recipe set from the master controller to the sub-system controller is performed during a portion of the second clock cycle of the clock signal.

2. The method of claim 1, wherein sending the recipe set from the command controller to the master controller comprises sending a packet via a transfer medium to the master controller, wherein sending the recipe set from the master controller to the sub-system controller includes sending the packet via a transfer medium to the sub-system controller.

3. The method of claim 1, further comprising:
sending by the master controller another recipe set for execution by another sub-system controller of the plasma system during the first clock cycle,
wherein the time of execution is for execution of the other recipe set by the other sub-system controller of the plasma system.

4. The method of claim 1, wherein the command controller is located within a computing device, wherein the computing device includes a laptop computer or a desktop computer or a tablet or a mobile phone.

5. The method of claim 1, wherein the recipe set includes a power of a radio frequency (RF) signal to be generated by an RF generator, or a frequency of the RF signal, or a pressure within a plasma chamber of the plasma system, or a temperature within the plasma chamber, or a gap between electrodes within the plasma chamber, or an amount of gas flow to the plasma chamber, or a capacitance of a capacitor of an impedance matching network of the plasma system, or an inductance of an inductor of the impedance matching network, or a combination thereof.

6. The method of claim 1, wherein the recipe set is executed by the sub-system controller when the recipe set is sent from the sub-system controller to a sub-system, wherein the sub-system controller is coupled to the master controller.

7. The method of claim 6, wherein the sub-system is a radio frequency (RF) generator, or a pressure sub-system, or a temperature sub-system, or a gap sub-system, or a gas flow sub-system, or an impedance matching network.

8. The method of claim 1, wherein the plasma system includes one or more radio frequency (RF) generators, an impedance matching network, and a plasma chamber, wherein the one or more RF generators are connected to the impedance matching network via one or more corresponding RF cables, wherein the impedance matching network is connected to the plasma chamber via an RF transmission line.

9. The method of claim 1, wherein the time of execution is a time at which the recipe event signal is received from the command controller by the sub-system controller, wherein the sub-system controller is connected to the master controller and controls a sub-system, wherein the recipe event signal being received by the sub-system controller causes an immediate execution of the recipe set.

10. The method of claim 1, wherein the time of execution is a time at which the recipe set is sent from the sub-system controller to a sub-system, wherein the sub-system controller is connected to the master controller for receiving the recipe set from the master controller.

11. The method of claim 1, wherein the recipe event signal triggers execution of the recipe set.

12. The method of claim 1, wherein the recipe event signal when received by the sub-system controller for a sub-system is indicative of immediate activation of execution of the recipe set.

13. A method comprising:
sending by a master controller a recipe set for execution by a sub-system controller during a first clock cycle of a clock signal, wherein the sub-system controller is configured to control a component of a plasma system;
generating by the master controller a recipe event signal;
sending by the master controller the recipe event signal indicating a time of execution of the recipe set by the sub-system controller of the plasma system, wherein the time of execution of the recipe set occurs during a second clock cycle that follows the first clock cycle during which the recipe set is sent, wherein the second cycle is of the clock signal; and
sending by the master controller an additional recipe set to the sub-system controller for execution by the sub-system controller of the plasma system, wherein said sending the additional recipe set from the master controller to the sub-system controller is performed during a portion of the second clock cycle of the clock signal.

14. The method of claim 13, wherein sending the recipe set comprises sending a packet via a cable to the sub-system controller.

15. The method of claim 13, wherein the plasma system includes one or more radio frequency (RF) generators, an impedance matching network, and a plasma chamber, wherein the one or more RF generators are connected to the impedance matching network, wherein the impedance matching network is connected to the plasma chamber.

16. The method of claim 13, further comprising:
sending by the master controller another recipe set for execution by another sub-system controller during the first cycle of the clock signal, wherein the other sub-system controller is configured to control another component of the plasma system,
wherein the time of execution is for execution is of the other recipe set by the other sub-system controller of the plasma system.

17. The method of claim 13, wherein the recipe set is executed by the sub-system controller by sending the recipe set to the component.

18. The method of claim 13, wherein the time of execution is a time at which the recipe event signal is received from the master controller by the sub-system controller, wherein the sub-system controller is connected to the master controller and controls the component.

19. The method of claim 13, wherein the time of execution is a time at which the recipe set is sent from the sub-system controller to the component.

20. The method of claim 13, wherein the recipe event signal triggers execution of the recipe set.

21. The method of claim 13, wherein the recipe event signal when received by the sub-system controller for the sub-system is indicative of immediate activation of execution of the recipe set.

22. A method comprising:
sending by a master controller a recipe set to a processor of a sub-system of a plasma processing system, wherein sending from the master controller occurs during a first clock cycle of a clock signal;
generating by the master controller a recipe event signal;
sending by the master controller the recipe event signal indicating a time of execution of the recipe set to the processor of the sub-system, wherein sending the time of execution occurs during a second clock cycle following the first clock cycle; and
sending by the master controller an additional recipe set to the processor of the sub-system for execution by the processor of the sub-system, wherein said sending the additional recipe set from the master controller to the processor of the sub-system is performed during a portion of the second clock cycle of the clock signal.

23. The method of claim 22, wherein sending the recipe set comprises sending a packet via a cable to the processor of the sub-system.

24. The method of claim 22, further comprising:
sending by the master controller another recipe set for execution by another processor of another sub-system, wherein the other processor is configured to control the other sub-system of the plasma processing system, wherein sending the other recipe set occurs during the first clock cycle,
wherein the time of execution is for execution of the other recipe set by the other processor of the other sub-system.

25. The method of claim 22, wherein the recipe set is executed by the processor when the processor of the sub-system sends a signal to a driver to generate a signal.

26. The method of claim 22, wherein the time of execution is a time at which the recipe event signal is received from the master controller by the processor, wherein the processor is connected to the master controller and controls the sub-system.

27. The method of claim 22, wherein the time of execution is a time at which the recipe set is sent from the processor to a driver to drive a part of the plasma processing system.

28. The method of claim 22, wherein the recipe event signal triggers execution of the recipe set.

29. The method of claim 22, wherein the recipe event signal when received by the processor is indicative of immediate activation of execution of the recipe set.

30. The method of claim 1, further comprising:
generating by the command controller an additional recipe event signal; and
sending by the command controller to the sub-system controller the additional recipe event signal indicating a time of execution of the additional recipe set by the sub-system controller, wherein the time of execution occurs during a third clock cycle that follows the second clock cycle, wherein the third cycle is of the clock signal.

* * * * *